United States Patent
Hirth

(10) Patent No.: US 10,982,440 B2
(45) Date of Patent: Apr. 20, 2021

(54) HANGING THREE DIMENSIONAL GRID SYSTEM FOR LIGHTING, DATA, AND POWER

(71) Applicant: Yvette Seifert Hirth, San Francisco, CA (US)

(72) Inventor: Yvette Seifert Hirth, San Francisco, CA (US)

( * ) Notice: Subject to any disclaimer, the term of this patent is extended or adjusted under 35 U.S.C. 154(b) by 216 days.

(21) Appl. No.: 16/028,334

(22) Filed: Jul. 5, 2018

(65) Prior Publication Data

US 2018/0340333 A1 Nov. 29, 2018

Related U.S. Application Data

(63) Continuation-in-part of application No. 15/068,604, filed on Mar. 13, 2016, now Pat. No. 10,030,386, which is a continuation-in-part of application No. 15/068,607, filed on Mar. 13, 2016, now Pat. No. 9,795,006.

(51) Int. Cl.

| | |
|---|---|
| *A47H 1/00* | (2006.01) |
| *E04B 9/00* | (2006.01) |
| *E04B 9/20* | (2006.01) |
| *F16B 2/06* | (2006.01) |
| *E04B 1/343* | (2006.01) |
| *F16B 2/12* | (2006.01) |
| *F16B 45/00* | (2006.01) |
| *F21S 2/00* | (2016.01) |
| *F16B 37/14* | (2006.01) |
| *F16B 37/04* | (2006.01) |

(52) U.S. Cl.
CPC .......... *E04B 9/006* (2013.01); *E04B 1/34305* (2013.01); *E04B 1/34326* (2013.01); *E04B 9/20* (2013.01); *F16B 2/065* (2013.01); *F16B 2/12* (2013.01); *F16B 37/045* (2013.01); *F16B 37/14* (2013.01); *F16B 45/00* (2013.01); *F21S 2/00* (2013.01)

(58) Field of Classification Search
CPC ... E04B 9/02; E04B 9/006; E04B 9/20; E04B 1/34326; E04B 1/34305; F04B 9/20
USPC .......... 248/320, 317, 321; 52/220.6, 506.06, 52/506.07; 211/113, 117
See application file for complete search history.

(56) References Cited

U.S. PATENT DOCUMENTS

| | | |
|---|---|---|
| 3,181,274 A | 5/1965 | Izenour |
| 3,748,793 A | 7/1973 | Tompkins et al. |
| 3,843,995 A | 10/1974 | Merrill |

(Continued)

*Primary Examiner* — Todd M Epps
(74) *Attorney, Agent, or Firm* — Law Office of Christopher Peil; Christopher Peil

(57) ABSTRACT

A three dimensional grid system for lighting, data, and power equipment that can be used to position both the grid system as well as any equipment mounted upon it above the user and away from or otherwise off the surface of their work area for optimum productivity. The grid system may include both manual and motorized lifters, so that the grid system may be raised or lowered for maintenance and configuration changes. Clamps hold equipment and move along the tubing for optimum equipment placement, and motorized equipment lifters raise and lower devices to/from the work area. For the motorized lifters, software is included that communicates with the device across internet connections and gives users the ability to reconfigure their work area remotely, without touching the device.

12 Claims, 42 Drawing Sheets

(56) References Cited

U.S. PATENT DOCUMENTS

| | | | |
|---|---|---|---|
| 3,984,930 A | 10/1976 | Booland | |
| 4,109,305 A | 8/1978 | Claussen | |
| 4,250,668 A | 2/1981 | Harrison, Jr. | |
| 4,471,596 A | 9/1984 | Deaton | |
| 4,717,099 A | 1/1988 | Hubbard | |
| 4,791,993 A | 12/1988 | Curran | |
| 5,049,218 A | 9/1991 | Martin | |
| 7,249,743 B1 | 7/2007 | Stearns | |
| 7,410,141 B2 | 8/2008 | Hartwick | |
| 8,371,458 B2 | 2/2013 | Yu | |
| 8,931,673 B2 * | 1/2015 | Stevens, IV | A45F 5/021 224/675 |
| 8,982,814 B2 * | 3/2015 | Frenne | H04L 5/0053 370/329 |
| 9,236,991 B2 * | 1/2016 | Frenne | H04L 5/0094 |
| 9,795,006 B2 * | 10/2017 | Hirth | F21V 29/77 |
| 10,030,386 B2 * | 7/2018 | Hirth | E04B 9/006 |
| 2006/0022214 A1 | 2/2006 | Morgan | |
| 2008/0285271 A1 | 11/2008 | Roberge | |
| 2012/0080944 A1 | 4/2012 | Recker | |
| 2013/0214699 A1 | 8/2013 | Jonsson | |
| 2020/0131765 A1 * | 4/2020 | Rimmer | E04B 9/14 |

\* cited by examiner 3401  3402

HANGING THREE DIMENSIONAL GRID SYSTEM FOR LIGHTING, DATA, AND POWER

CROSS REFERENCE TO RELATED APPLICATION

This application is a continuation-in-part of U.S. patent application Ser. No. 15/068,604 filed on Mar. 13, 2016 and U.S. patent application Ser. No. 15/068,607 filed on Mar. 13, 2016 and issued on Oct. 17, 2017 as U.S. Pat. No. 9,795,006, which are hereby incorporated in their entirety by this reference thereto.

BACKGROUND

Technical Field

Generally, the present disclosure relates to a type of hanging equipment organizer that organizes equipment used in work areas by raising the equipment off the plane of the work area. More particularly, the present disclosure relates to a three dimensional grid system for lighting, data, and power.

Background Discussion

One type of "grid" system is a suspended ceiling system. Suspended ceiling systems are well-known in the art, and have been in existence for many years. They are designed to keep the ceiling tiles, ventilation grilles, and lights up, but are not designed for moving things up and down. Nor are they designed to move things in the XY axis of the suspended ceiling. Further, once installed, suspended ceiling systems are fixed at a given height and are not movable.

SUMMARY

A three dimensional grid system for lighting, data, and power equipment that can be used to position both the grid system as well as any equipment mounted upon it above the user and away from or otherwise off the surface of their work area for optimum productivity. The grid system may include both manual and motorized lifters, so that the grid system may be raised or lowered for maintenance and configuration changes. Clamps hold equipment and move along the tubing for optimum equipment placement, and motorized equipment lifters raise and lower devices to/from the work area. For the motorized lifters, software is included that communicates with the device across internet connections and gives users the ability to reconfigure their work area remotely, without touching the device.

The grid system may include a set of tubes and tubing holders mounted on cross pieces. The tubing, in embodiments, can be either hollow for light loads, or solid for heavier loads. The cross pieces maintain the tubing spacing on specified interval centers, creating a series of parallel tubing segments to which clamps and equipment holders can easily be attached. Motorized lifters can raise and lower the entire grid system, permitting easy maintenance and reconfiguration. Individual components can both be moved along the XY axes as well as raised and lowered along the Z axis using manual or motorized lifters, effectively changing the equipment configuration as required by the user.

In embodiments, the grid system gives users the ability to move their lighting devices around the work space in three dimensions as well as vertical-to-horizontal tilting, for improved illumination of the work area.

Additionally, the device frees work area space in a three-dimensional manner by moving work space equipment up and down in the Z axis using trays and lifters that are either manually operated or use electric motors and cables, providing more usable work area space. Software included with the device gives users the ability to control individual motorized lifters for both equipment and for the grid system itself.

Still further, the device gives users the ability to organize their work area space. As not all equipment is required at one time for one task, users can "group" equipment used for common tasks onto one liftable tray, so that they simply lower that tray when they have that type of work to do, and raise it up and away when they don't have that type of work to do. Equipment that is used "cross-task"—for example, adding machines or power supplies—can be placed or grouped in separate trays. Software included with the device gives users the ability to define "tasks" and the equipment needed for that task. Users can then select a task and the appropriate equipment is lowered to the user-specified position while equipment not needed for that task is maintained in a raised position which keeps it out of the way.

BRIEF DESCRIPTION OF THE DRAWINGS

Various other objects, features, and attendant advantages of the present device will become more fully appreciated as the same becomes better understood when considered in conjunction with the accompanying drawings, in which like reference characters designate the same or similar parts throughout the several views, and wherein.

DEFINITIONS

"Chicago Screw" shall be defined as a type of fastening device in which a typical fastener such as a hex or square nut is replaced by a thread that is housed inside a cylindrical shaft attached to a screw head;

"CPU" shall be defined as either a microprocessor, or a microcontroller, or a programmable logic controller, or as some combination of one or more of the above-listed components in a configuration that will run software program instructions;

"Grid" shall be defined as an assembly of tubing, crosspieces, and tubing holders that mount on the crosspieces to maintain the tubing spacing at 6 inches on centers;

"Vendor" shall be defined as any manufacturer of CPU devices; and

"Work Area" shall be defined as either a desk or a work bench, where work is being done.

DETAILED DESCRIPTION

A three dimensional grid system for lighting, data, and power equipment that can be used to position both the grid system as well as any equipment mounted upon it above the user and away from or otherwise off the surface of their work area for optimum productivity. The grid system may include both manual and motorized lifters, so that the grid system may be raised or lowered for maintenance and configuration changes. Clamps hold equipment and move along the tubing for optimum equipment placement, and motorized equipment lifters raise and lower devices to/from the work area. For the motorized lifters, software is included that communicates with the device across internet connections and gives users the ability to reconfigure their work area remotely, without touching the device.

In combination with the attached drawings, the technical contents and detailed description of the grid system are presented hereinafter according to a number of embodiments, but should not be used to limit its scope. Any equivalent variations and modifications made according to appended claims are covered by the claims attached hereto.

Figure 1:
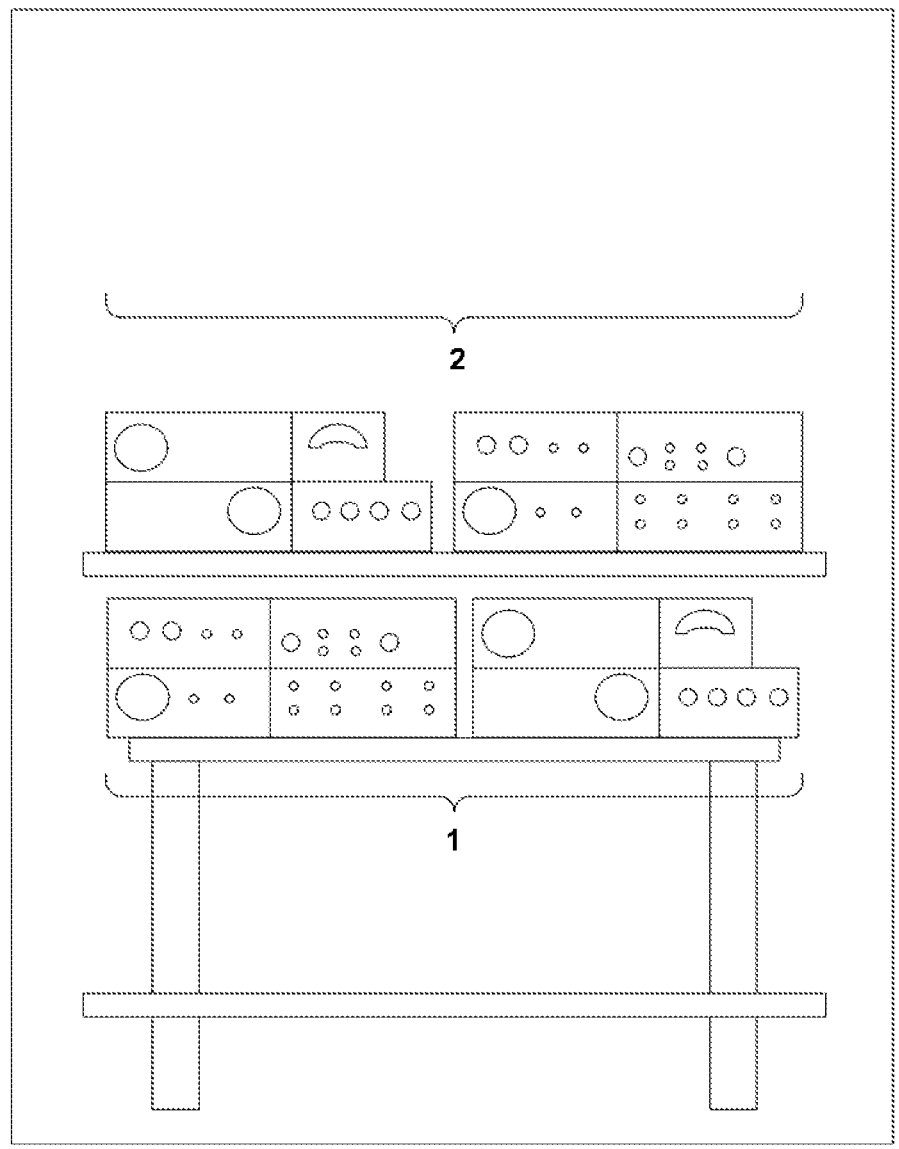
FIG. 1 shows a typical work space from a front view.
Figure 2:
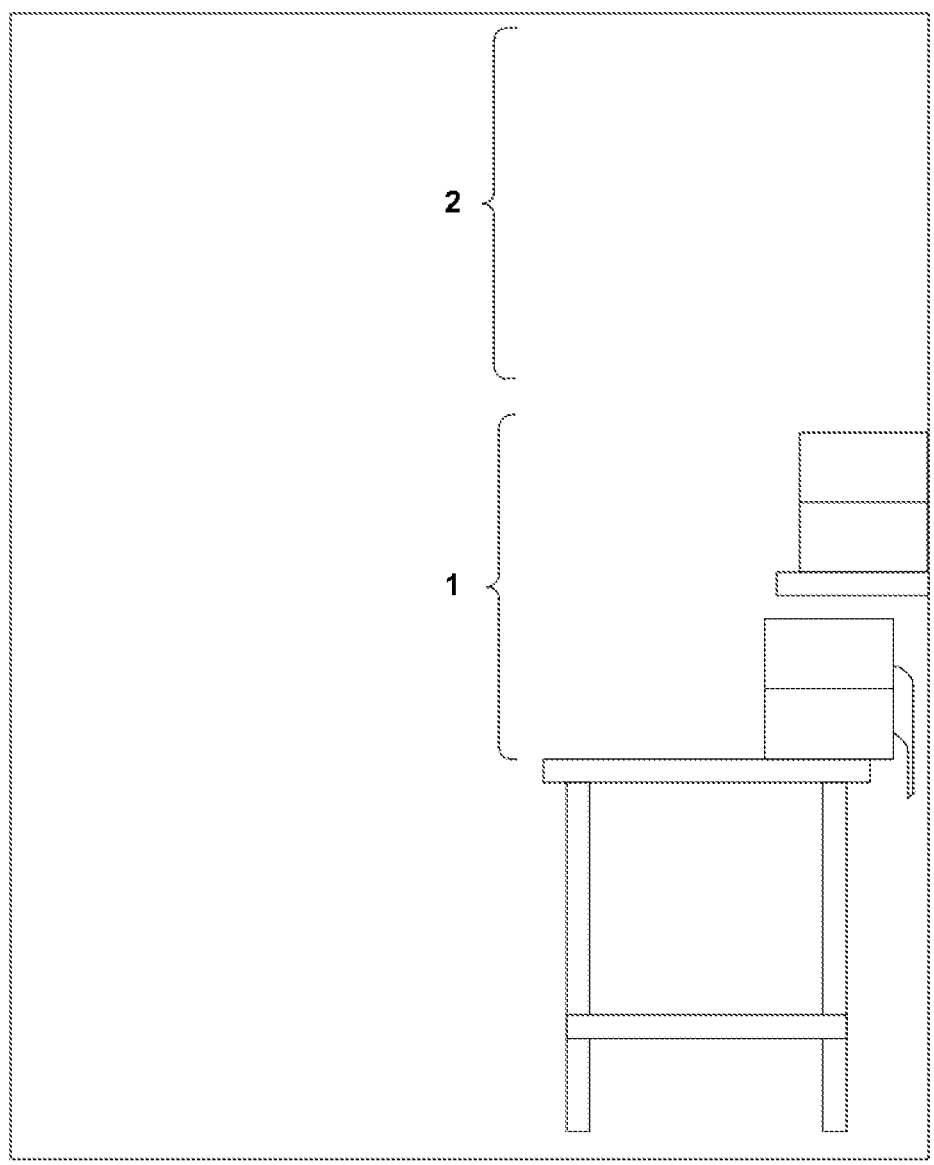
FIG. 2 shows the work space of FIG. 1 from a side view.

In FIGS. 1 and 2, a typical electronics work area is depicted. The area 1 shown in FIG. 1 is a depiction of a sample set of equipment that is stored on the electronics work area bench and shelves. Note that the area above the work area, 2, is empty and underutilized. In FIG. 2, the encroachment of the equipment 1 on the desk and in the vertical space above the work area can be clearly seen. In this sample depiction, moving equipment from area 1 to area 2 frees up approximately ⅓ of the bench work space, and the lifters required to utilize the space in area 2 may save back injuries when moving heavy equipment.

Figure 3:
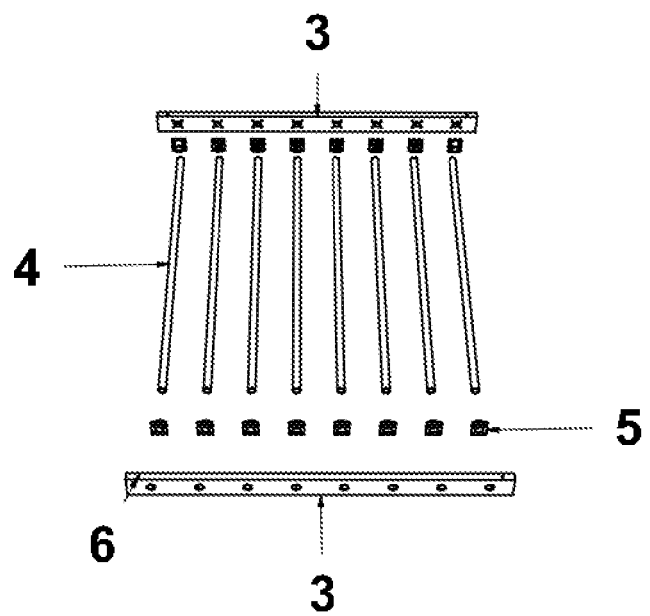
FIG. 3 shows the basic components of a grid system.

In FIG. 3, the basic components of the grid system area shown. The grid tubes 4 may connect to the grid tube holders, 5, which may be fastened onto the grid crosspieces, 3. In embodiments, each crosspiece has two holes, 6, at either end of the crosspiece, through which eyehooks or other fastening devices may be attached to vertically support the grid.

Figure 4:
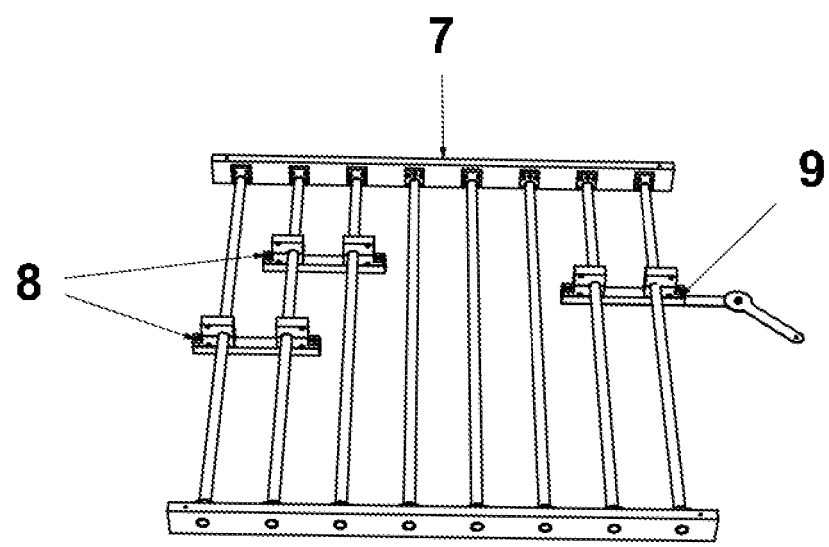
FIG. 4 shows an exemplary grid system having brackets that have light-weight clamps.

In an embodiment, shown in FIG. 4, three light-weight clamp brackets are fastened to the grid. Two light-weight two-clamp non-pivoting brackets 8 are attached to the grid, and the third two-clamp bracket, 9, also has a pivoting bracket, for extension of equipment beyond the sizing of the grid. In such an embodiment, each two-clamp bracket may be slid along the tubing in the Y axis and may provide approximately 7-8" of movement along the X axis without moving the bracket. Brackets may be unclamped, moved in the X axis, and re-clamped, thus providing movement greater than 7-8" along the X axis as well. In embodiments, light-weight clamps "clamp" onto the bar using springs only, and in such embodiments, the springs may be designed to hold up to 5 lbs./2 kg.

Figure 5:
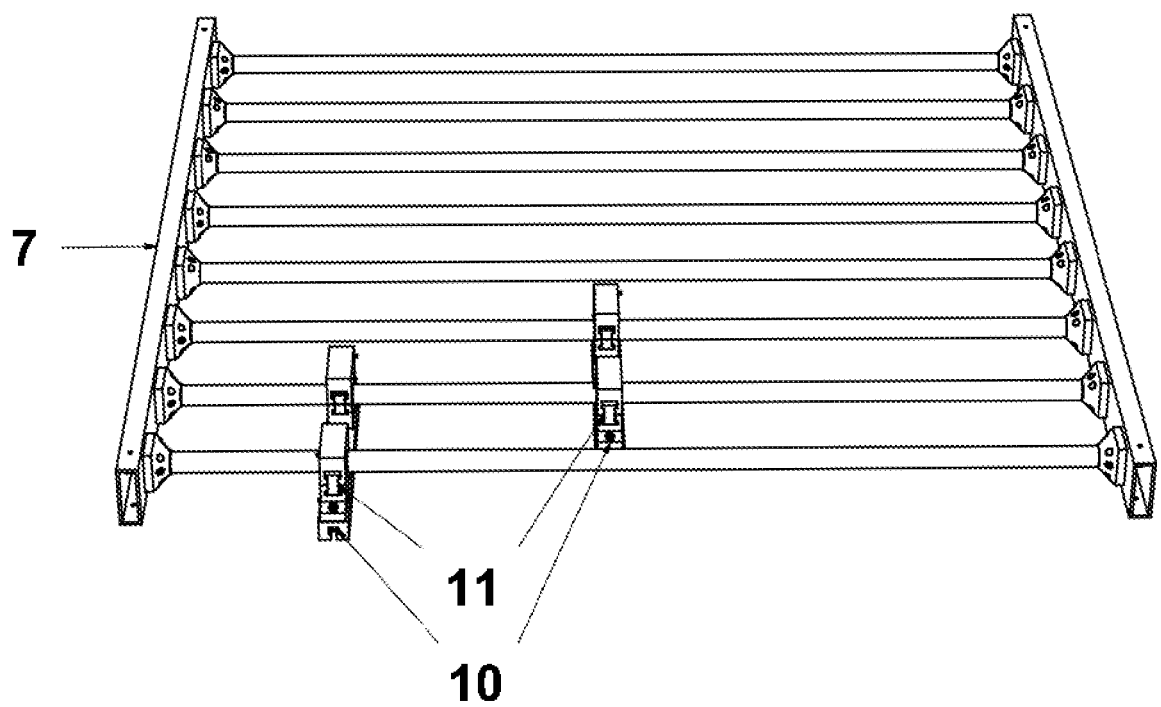
FIG. 5 shows an exemplary grid system having brackets that have medium-weight or heavy-weight clamps.

In another embodiment, shown in FIG. 5, two medium-weight clamp brackets 10 are fastened to the grid. The brackets may have keepers 11 that relieve the bracket springs from the weight of the attached load, thus, the brackets depicted in this embodiment can support a heavier weight than the embodiment of light-weight brackets described above. In embodiments, heavy-weight brackets may be constructed the same way as medium-weight brackets, but may be made of a stronger material, such as aluminum, instead of a lighter load material, such as plastic. Embodiments of a medium-weight bracket design which are realized using metal may allow the bracket structure to carry heavier loads.

Figure 6:
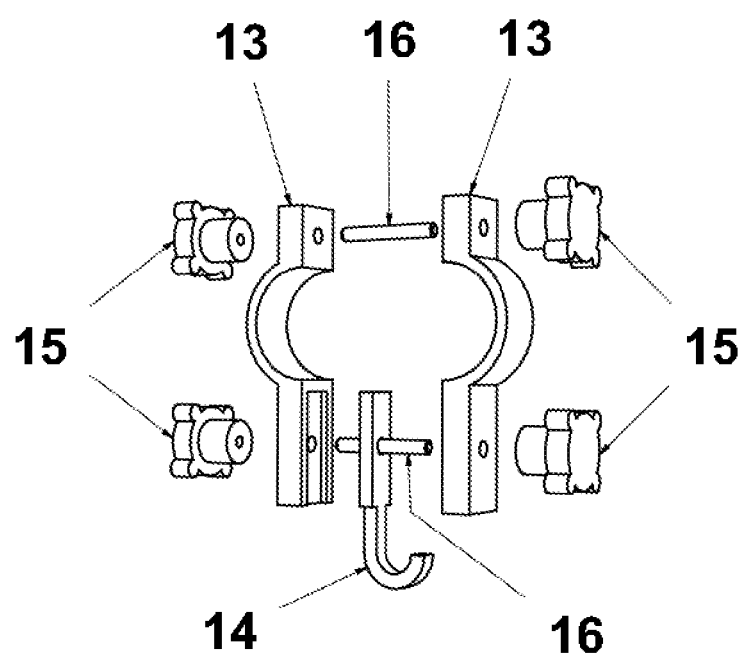
FIG. 6 shows a fixed-height hook on a single clamp.

In the embodiment of FIG. 6, the components of a single grid bracket with a fixed-height hook can be clearly seen. The two halves of the bracket 13 may be clamped together around the tubing using threaded studs 16 and tightening knobs 15. The two halves, along with the lower stud, may secure a hook 14. By loosening the tightening knobs 15 the clamp may be moved along the tubing in the Y axis; by loosening the lower tightening knob and removing the top one, the clamp may be split open and moved to a different tube, thus providing movement along the X axis of the grid.

Figure 7:
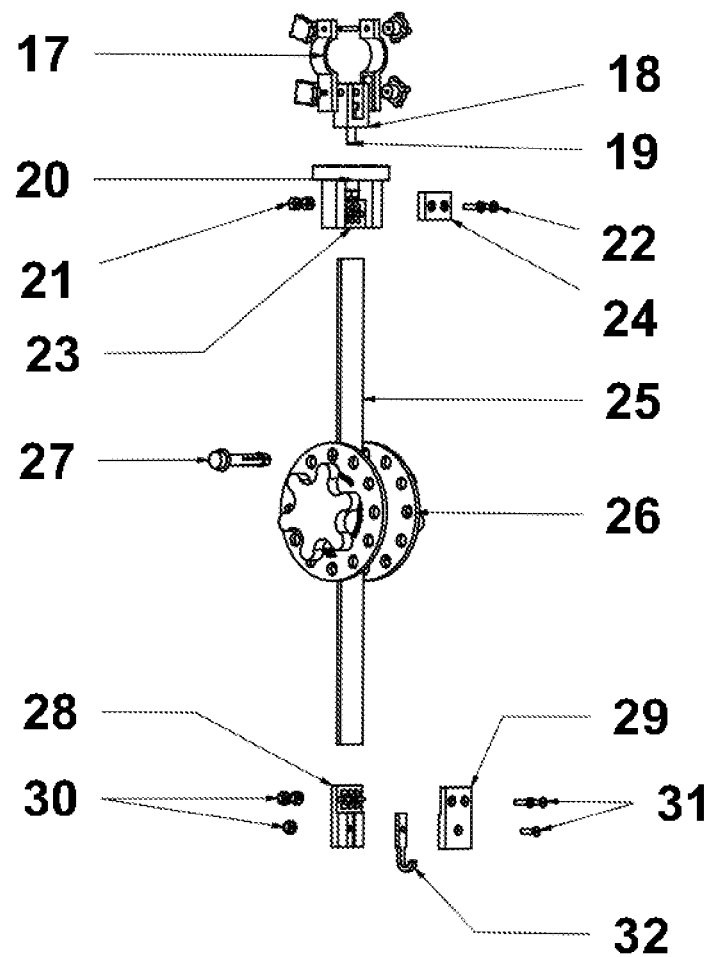
FIG. 7 shows a variable-height hook on a single clamp.

In the embodiment of FIG. 7, the components of a single grid bracket with an adjustable-height hook can be clearly seen. The two halves of the bracket 17 may be clamped onto the tubing using threaded studs and knobs in a manner similar to the single grid bracket with a fixed-height hook detailed above, but in embodiments may contain a pivoting clamp 20 mounted on a pivoting yoke 18 attached by a screw 19 that may rotate in the XY axis. The pivoting clamp 20 may hold the end of a length of strapping 25 and the end of the strapping 25 may be affixed to the pivoting clamp 20 using a pressure plate 24 and fastening screws 22 that are kept tight with nuts 21.

Excess strapping 25 may be taken up using a strap takeup reel 26 which may use a strap takeup reel keeper pin 27 to keep it from unrolling.

The other end of the strapping may be attached to a clamp 28 and its pressure plate 29 using fasteners such as screws 31 that are kept tight with nuts 30. The clamp 28 and pressure plate 29 may secure a hook 32. In embodiments, the strap takeup reel 26 may allow the hook to be moved up and down in the Z axis, and by adjusting the knobs on the bracket 17 as described above the bracket itself may be moved in the XY axis.

Figure 8:
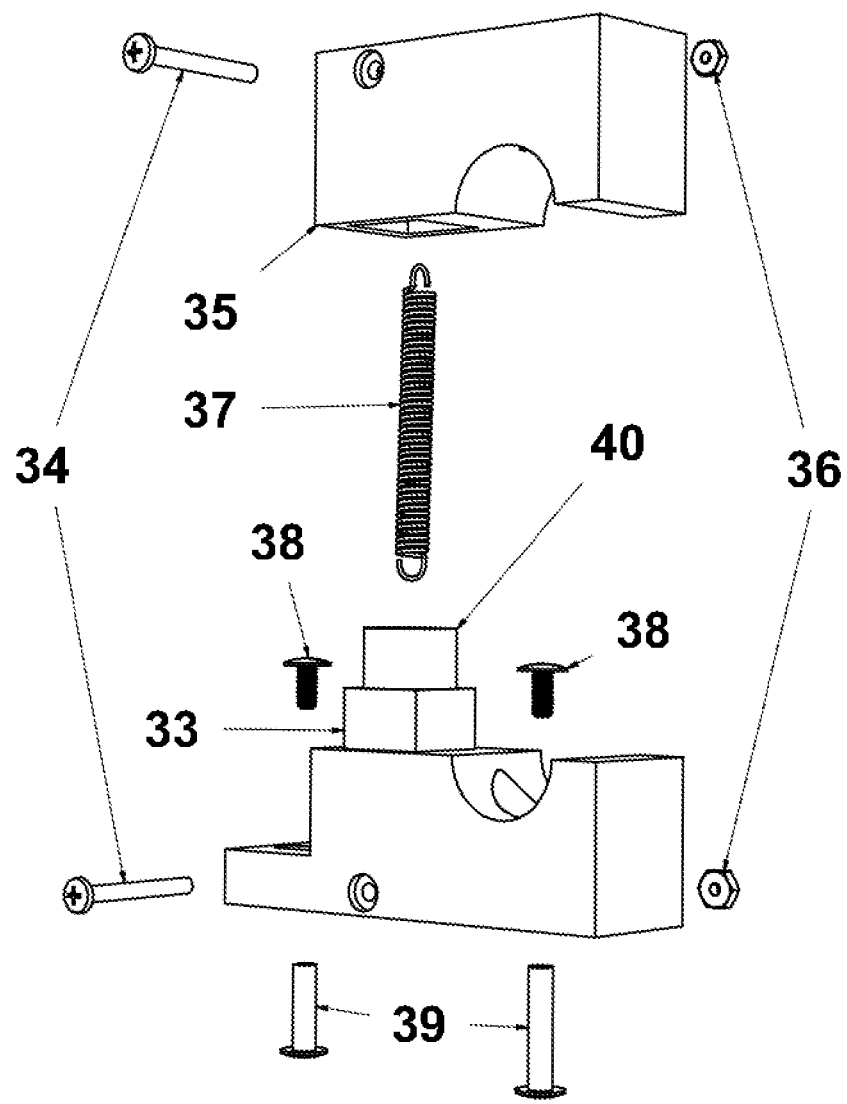
FIG. 8 shows an embodiment of a light-weight clamp.
Figure 27:
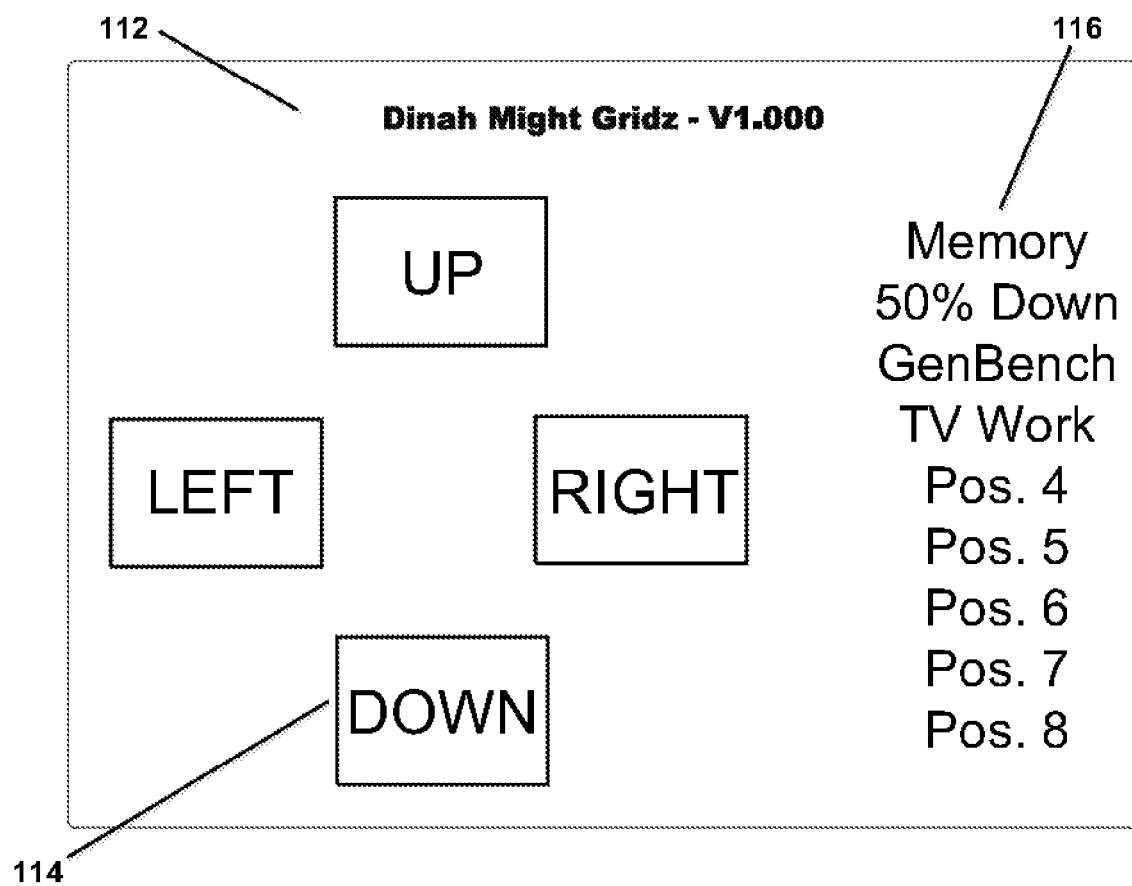
FIG. 27 shows the application equipment management and control display.

FIG. 27 shows one embodiment of a 'snap-on' single bracket, designed to hold more movable, light-weight objects that do not require the clamp to be tightened against the tubing. The embodiment of FIG. 8 is self-balancing and may contain light-weight steel wire or cables. In the embodiment shown, there is a keeper 104 that slides along the outer edge of the bracket 103. The keeper is bolted to the bracket with a flat-head screw 105 and tightening knob 106. To install the bracket, the user ensures the knob 106 is loose, then slides the keeper 104 towards the bracket 103 until the bracket can be slipped over the tubing, at which point the user slides the keeper 104 away from the bracket 103 until the keyed end of the keeper is approximately horizontal, then the user tightens the knob 106 and the keeper is contained on the bracket. In the embodiment shown, the load is hung from the wire 110 which is secured to the bracket by the bracket cover screw 107, the bracket cover 109 and the bracket knob 108.

In the embodiment of FIG. 8, individual components of one of the clamps in the light-weight two-clamp grid bracket can be seen. The top half of the clamp 35 may be affixed to a spring 37 using a screw 34 and a nut 36, while the other end of the spring 37 may be affixed to the bottom half of the clamp 33 using the same hardware. In such an embodiment, the two clamps are kept aligned by the square cross-section of the vertical post on the bottom half of the clamp 33.

Figure 9:
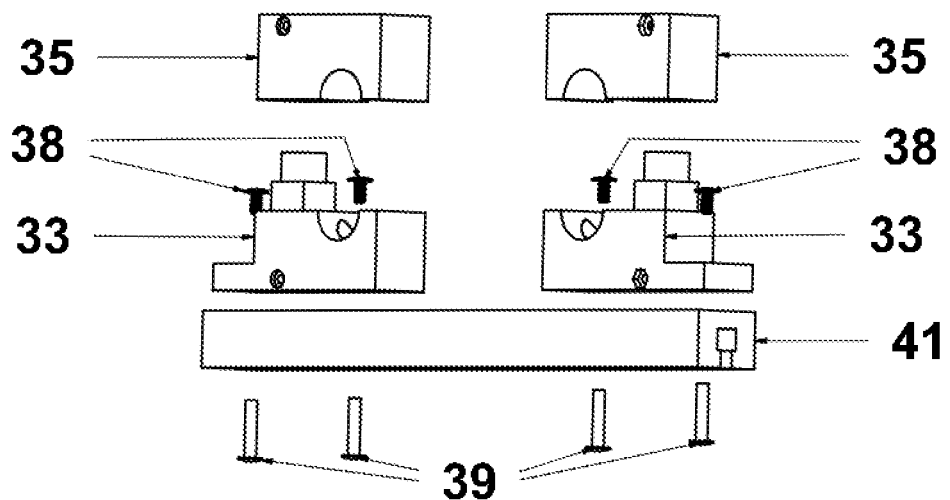
FIG. 9 shows embodiments of light-weight clamps in relation to the sliding bar on which they are mounted.

An embodiment of components that may be used to affix the assembled clamp from FIG. 8 to equipment holding bar 41 is shown in FIG. 9. The Chicago screws 39 and their mating connectors 38 may affix the lower half of the clamp bracket 33 to slots in the sliding bar 41. The slots in the sliding bar 41 may provide for the clamp to slide along the tubing slightly, thus providing for tubing to be clamped securely even if the tubing is not precisely on 6" centers.

Figure 10:
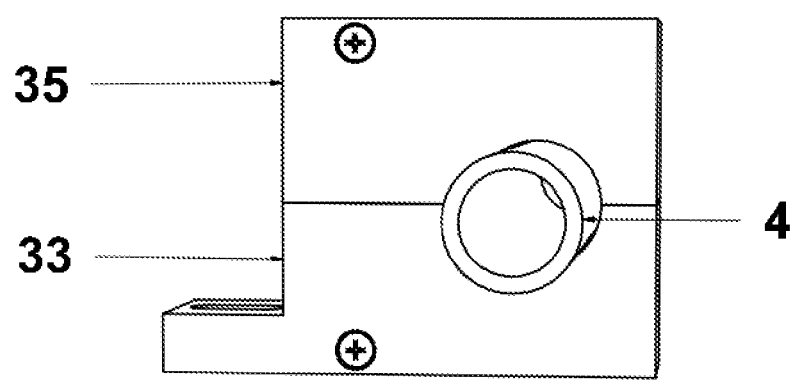
FIG. 10 shows a light-weight clamp that is closed on a tube.
Figure 11:
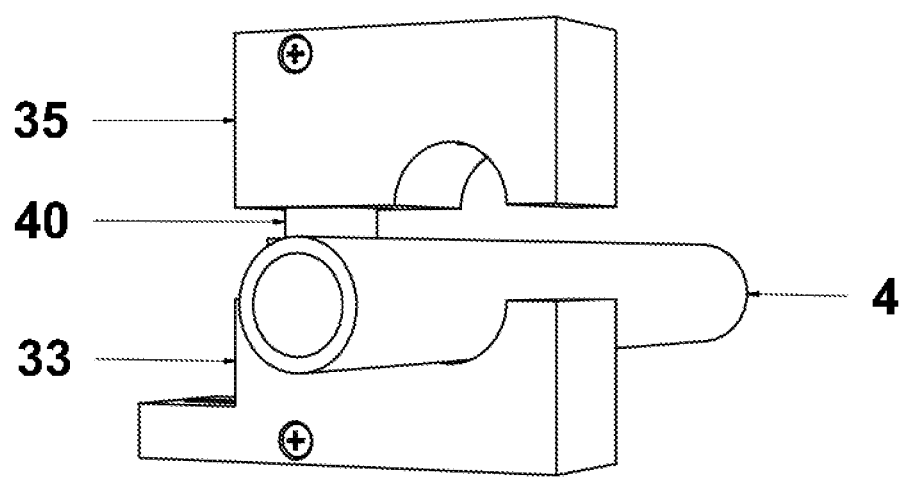
FIG. 11 shows a light-weight clamp that is open.
Figure 12:
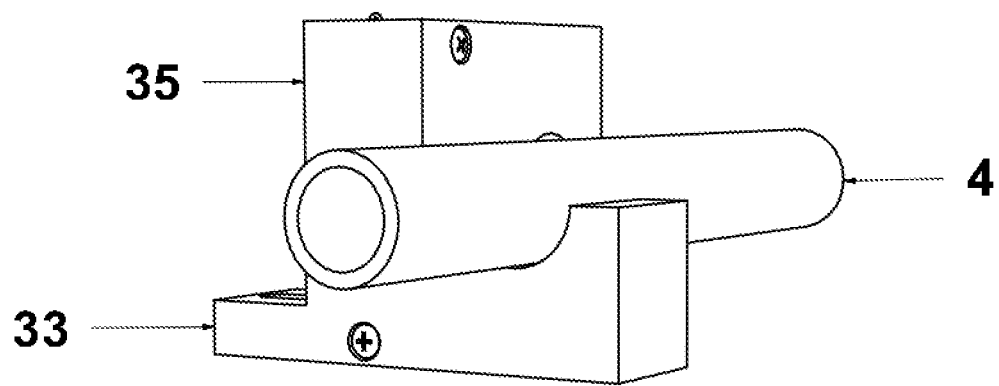
FIG. 12 shows a light-weight clamp that is closed but not on a tube.

In an embodiment of a light-weight clamp depicted in FIGS. 10-12, the changing configuration of the clamp as it is being removed from a grid tube are shown. FIG. 10 depicts the closed clamp. Should a user decide to unclamp the bracket from the tubes to which it is currently clamped, FIG. 11 depicts the first step: the user needs only to lift the top bracket clamp 35 to a point above where the square hole in the top clamp 35 receives the square post of the bottom clamp 33, and rotate it around the round portion 40 of the bottom clamp post. After the top half of the clamp is rotated, the clamp spring 37 shown in FIG. 8 may reassert its pressure and close the clamp in the open position as depicted in FIG. 12.

Figure 13:
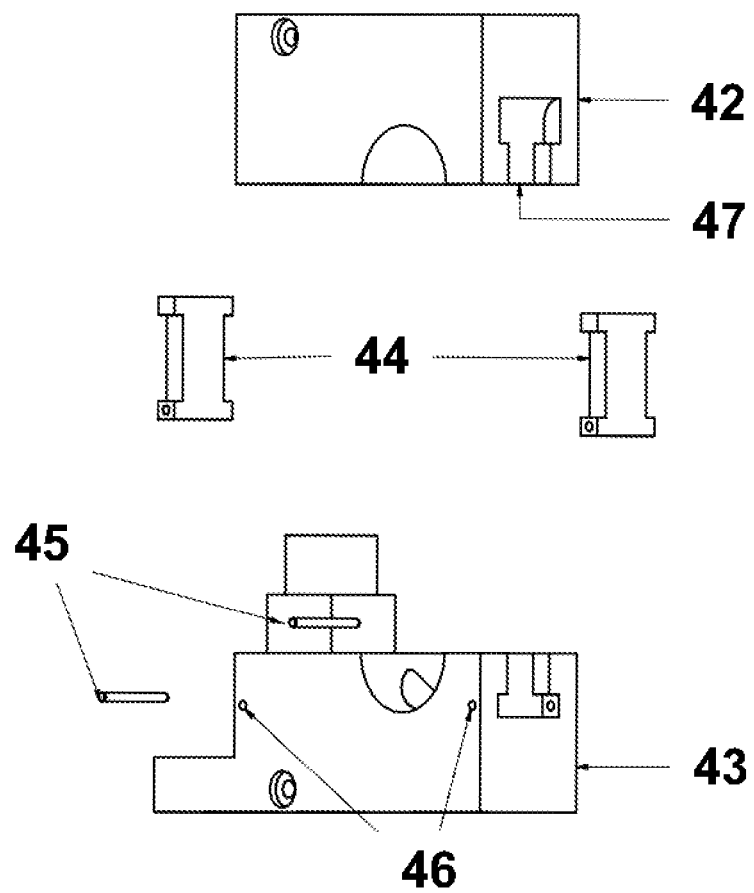
FIG. 13 shows a medium-weight or heavy-weight clamp.

In an embodiment shown in FIG. 13, the differences between a light-weight clamp and a medium-weight or heavy-weight clamp are depicted. Clamp keepers 44 may pivot around shafts 45 affixed to the bottom half of the clamp 43 and, when closed, engage the top half of the clamp 42. Such clamp keepers may be secured by the pressure of the weight on the bracket in their respective receiving areas 47 in the top half of the clamp.

Figure 14:
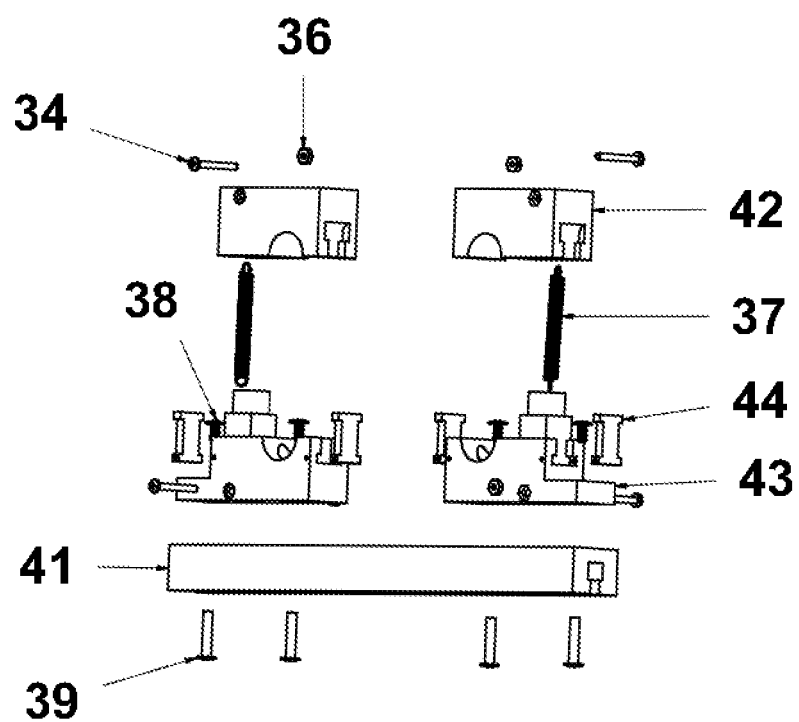
FIG. 14 shows embodiments of medium-weight or heavy-weight clamps in relation to the sliding bar on which they are mounted.

In an embodiment shown in FIG. 14, the components of a medium-weight or heavy-weight clamp can be seen. The components are identical to those of a light-weight clamp with the exception of the added clamp keepers 44.

Figure 15:
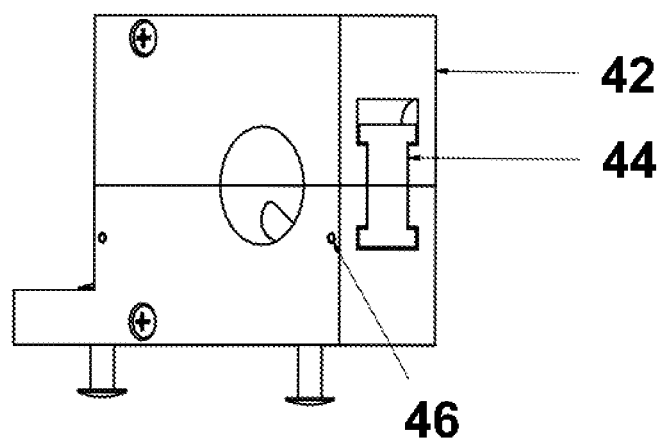
FIG. 15 shows a medium-weight or heavy-weight clamp that is closed.

In an embodiment shown in FIG. 15, a clamp keeper 44 in the bottom half of a medium-weight or heavy-weight clamp is engaged in the top half of the clamp. The clamp keepers may rotate around a shaft in the bottom half of a medium-weight or heavy-weight clamp that is inserted into the clamp keeper shaft hole, 46.

Figure 16:
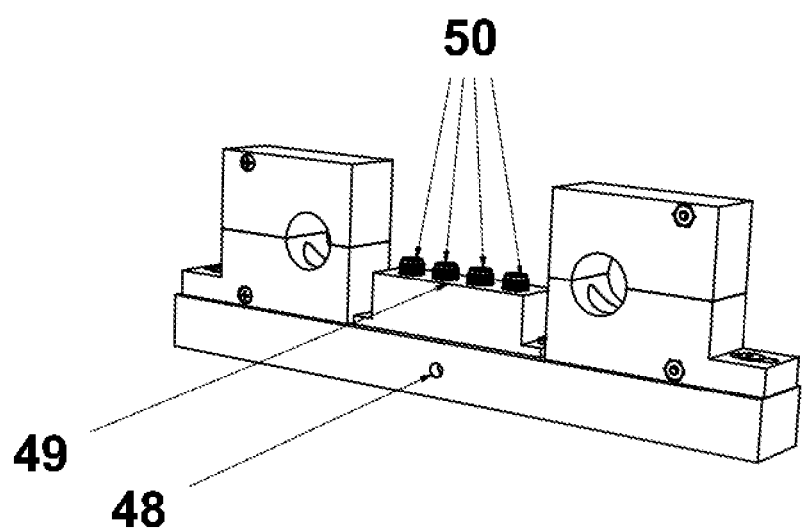
FIG. 16 shows a power distribution bar.

In FIG. 16, an embodiment of a power distribution bracket is shown. Power distribution brackets are light-weight brackets on which a power distribution block 49 may be mounted that may contain up to four power-distribution electrical sockets 50. In embodiments, as power-distribution blocks may not be intended to be used for positioning equipment, they may not carry any weight other than their own, and thus there may not be a T-slot in the power distribution sliding bar 48. The electrical supply cable carrying the power to be distributed may enter the power distribution sliding bar at the center opening 48, and may terminate within the power distribution block 49.

Figure 17:
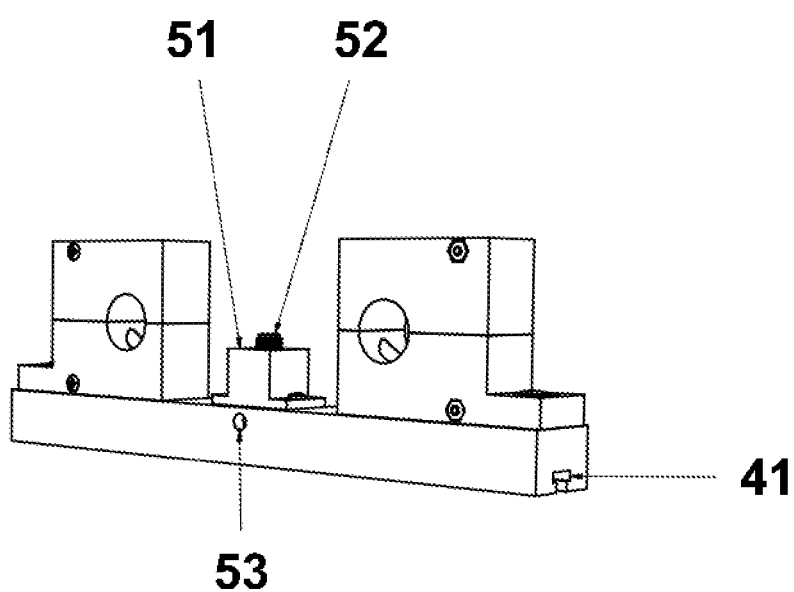
FIG. 17 shows an equipment power bar.

In FIG. 17, an embodiment of an equipment power bracket is shown. In such embodiments, equipment power brackets may be either lightweight, medium-weight or heavy-weight brackets that supply power to the equipment they are holding in the T-slot of their sliding bar 41. The equipment being held may draw power from the power supply socket 52 which may be mounted on the power supply block 51. In embodiments, the power cable may enter the equipment power bracket in an ingress hole 53 which may be positioned high up on the side of the sliding bar 41 so as to provide for the cable to be able to enter the power supply block 51 without interfering with the sliding ability of the equipment in the sliding bar T-slot 41.

Figure 18:
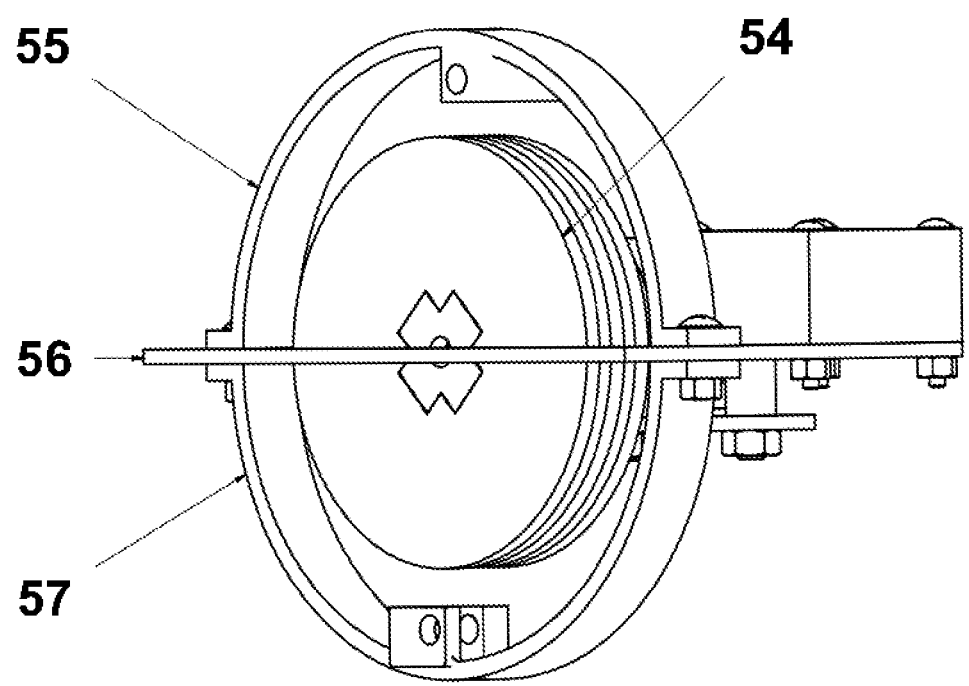
FIG. 18 shows a front view of a grid lifter device.
Figure 19:
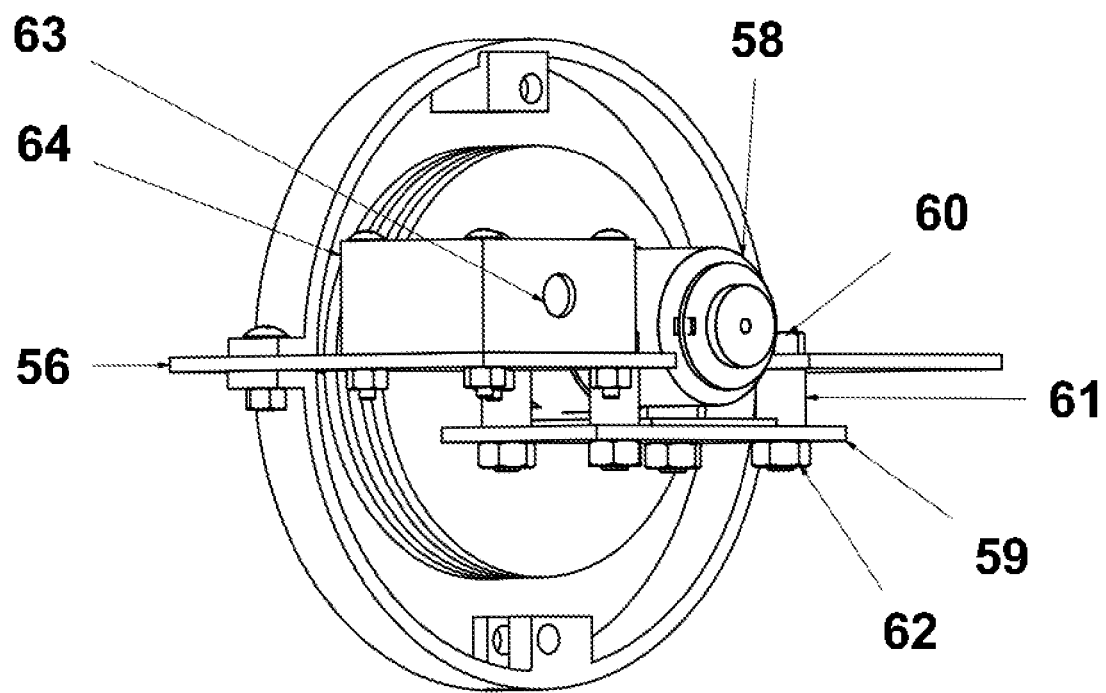
FIG. 19 shows a back view of a grid lifter device.

In FIGS. 18 and 19, an embodiment of a grid lifter is shown. In the embodiment shown in FIG. 18, the hanging cable takeup reel 54 is turned by an electric motor and simultaneously takes up both the hanging cable attaching the grid lifter to the ceiling as well as the other hanging cable attaching the grid lifter to the grid. In embodiments, both cables attached to the hanging cable takeup reel may wind at the same rate, and may thus keep the grid lifter midway between the grid and the ceiling. The cables may be routed to/from the hanging cable takeup reel via openings to bearings in the top and bottom cable takeup reel guide brackets, 55 and 57, which may be mounted to the grid lifter base plate 56.

In the embodiment of a grid lifter shown in FIG. 19, the back of the grid lifter is further depicted. The grid lifter motor 58 may be mounted to a motor mount plate 59 which in turn may be mounted on the grid lifter base plate 56 using bolts 60, spacers 61 and nuts 62. In embodiments, a separate motor mount plate is required to maintain the motor's shaft, which is the axis of revolution, in the same plane as the grid lifter base plate 56. In the embodiment shown, the spacers move the mounting plane of the grid lifter motor 58 downwards so that the center of the motor's shaft may align with the center of the plane of the grid lifter base plate 56.

Power may be distributed to the grid lifter via a coiled cable (not shown) that may enter the motor wiring box 64 through a power ingress access hole 63.

Figure 20:
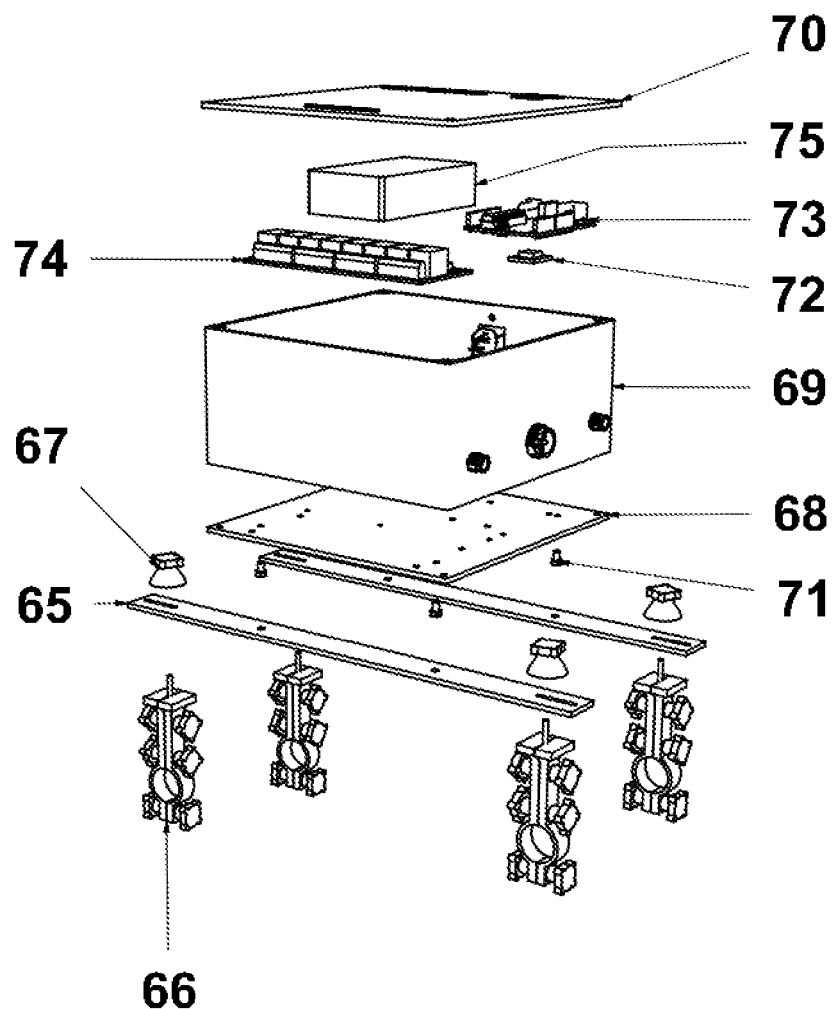
FIG. 20 shows a grid balancing device.

In the embodiment shown in FIG. 20, components that comprise an embodiment of the grid lifter balancing device may be seen. In this embodiment, the grid lifter balancing device may comprise a casing 69 on which a back plate 68 and a front plate 70 may be mounted, and when assembled may be mounted on two flat bars 65 which in turn may be mounted on embodiments of four studded clamp brackets 66. The grid lifter balancing device may thus be mounted in a plane parallel to the plane of the grid and mounted slightly above the tubing, which may then provide access to the tubing underneath the grid lifter balancing device for other clamps.

In embodiments, the grid lifter balancing device may include a power supply 75, a processor 73, an accelerometer 72 and solenoids 74. An embodiment of the grid lifter balancing device uses the accelerometer 72 to feed tilt information known as gamma to the processor 73 via a coiled multi-conductor cable (not shown) to the processor 73 which then varies power to the four grid lifter motors in a manner that may minimize gamma, thus providing that the grid remains parallel to the ground while being lifted or lowered.

Figure 21:
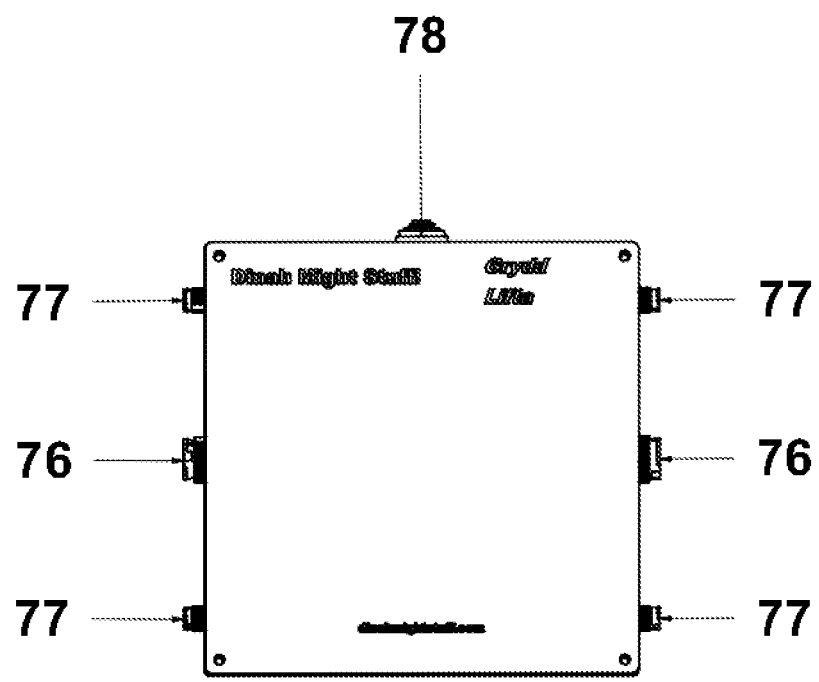
FIG. 21 shows connectors in an embodiment of the grid balancing device of FIG. 20.

In FIG. 21, the connectors of an embodiment of the grid lifter balancing device are shown. In embodiments, the four small two-wire connectors 77 may be connected to the four grid lifter motors by two-wire coiled power cables (not shown). There is only one remote control for the grid lifter balancing device, but two remote control cable connectors may be provided so as to simplify routing of the remote control power cord. In embodiments, an IEC universal line-voltage power cord connector 78 may provide power to the device.

Figure 22:
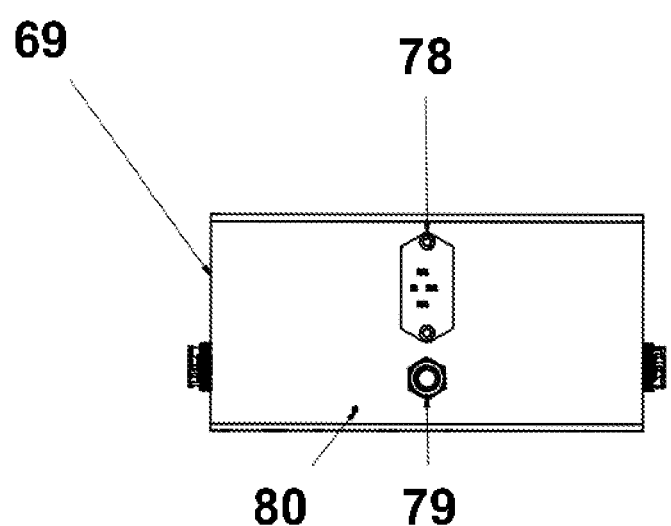
FIG. 22 shows connectors in a further embodiment of the grid balancing device of FIG. 20.

In FIG. 22, the power and reset connectors of an embodiment of the grid lifter balancing device are shown. In embodiments, a circuit breaker and its reset button 79 may be mounted on the side of the casing 69 and directly next to the IEC universal line-voltage power cord connector 78. The circuit breaker reset button 79 may be used in the event the circuit breaker needs to be reset due to an overload condition. In embodiments, the processor restart access hole 80 provides a method of restarting the processor in case of a hardware or software failure.

Figure 23:
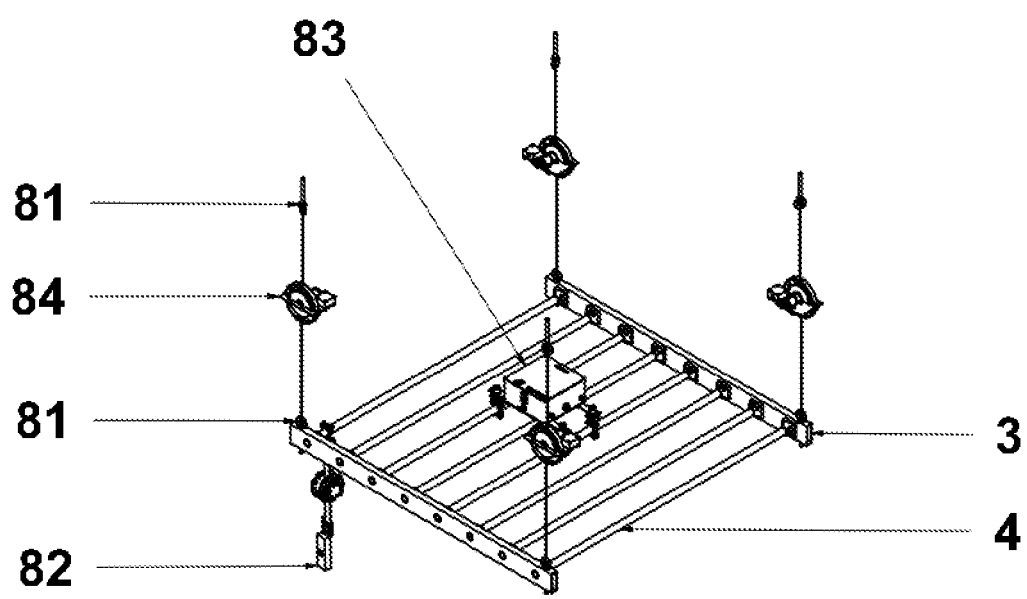
FIG. 23 shows an assembled grid with a grid balancing device and a plurality of grid lifter devices.

In FIG. 23, an assembled embodiment of the device is depicted. Eyehooks 81 may be bolted to the grid crosspieces 3 and may be attached to the lower cables from four grid lifter motors 84. The upper cables from the grid lifter motors may be attached to another four eyehooks 81 which in turn may be attached to the work space ceiling or superstructure. In embodiments, the grid lifter balancing device 83 sits on the tubing 4 and may control the grid lifter motors 84, while the remote control 82 for the grid lifter balancing device is shown hanging from a hook of a single adjustable-height clamp.

Figure 24:
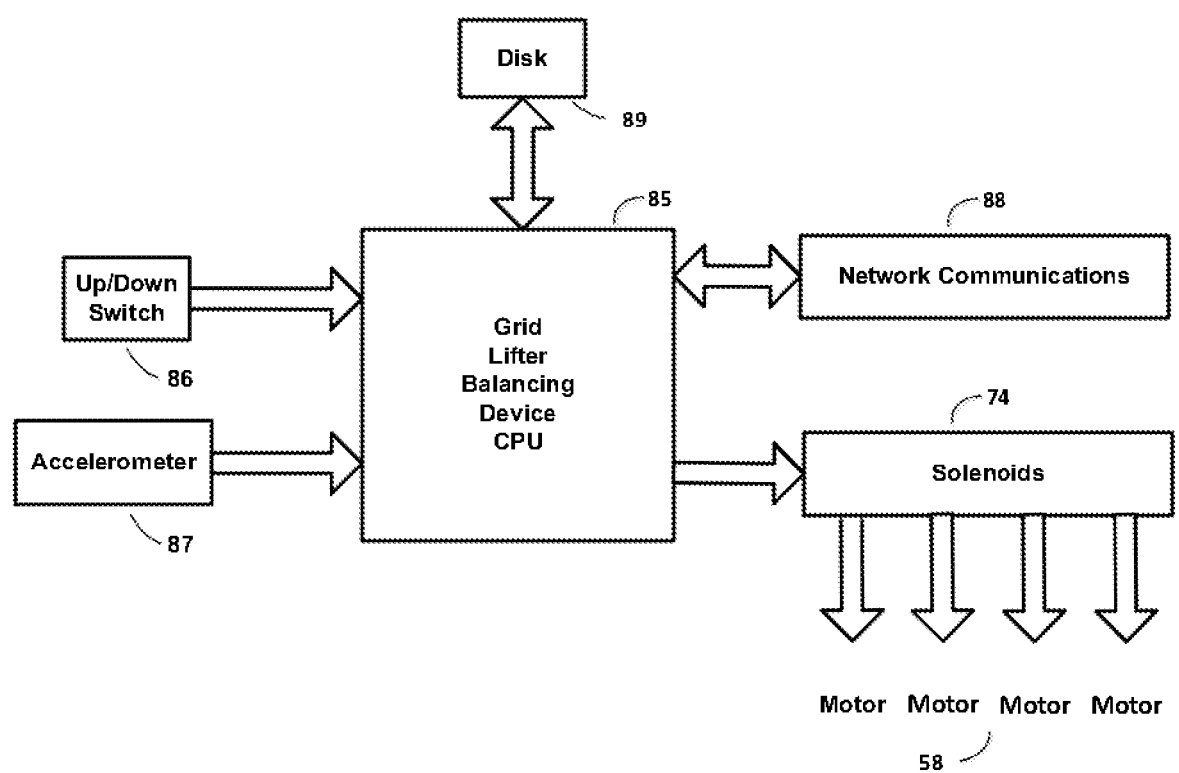
FIG. 24 shows an overview of the circuitry used in the grid lifter balancing device of FIG. 20.

In FIG. 24, an overview of an embodiment of the circuitry in the grid lifter balancing device is shown. In the embodiment shown, the Up/Down switch 86 controls the movement of the grid lifter by generating a positive input for up and a negative input for down; the processor 85 senses this input and queries the accelerometer 87 for balance information transmitted via the gamma value. In embodiments, all movement of the grid lifter balancing device may be controlled via an application, which may communicate with the grid lifter balancing device via local networking 88.

The processor may know how many rotations of the motors to make to raise the grid to its highest level possible and to lower the grid to its lowest level possible during installation, and this information may be stored on the disk 89.

For upward movements, the gamma information tells the processor 85 which motor is "lowest", and the processor may energize motors 58 via the solenoids 74 in such a manner as to first level the grid, and then raise the grid until the grid reaches either the desired height or the minimum wound-up height per the information stored on disk 89, at which time the processor blocks the Up signal and stops; or until the Up signal is no longer present.

For downward movements, the balance information tells the processor 85 which motor is "highest", and the processor may energize motors 58 via the solenoids 74 in such a manner as to first level the grid, and then lower the grid until the grid reaches either the desired height or its fully extended height per the information stored on disk 89, at which time the processor blocks the Down signal and stops; or until the Down signal is no longer present.

Figure 25:
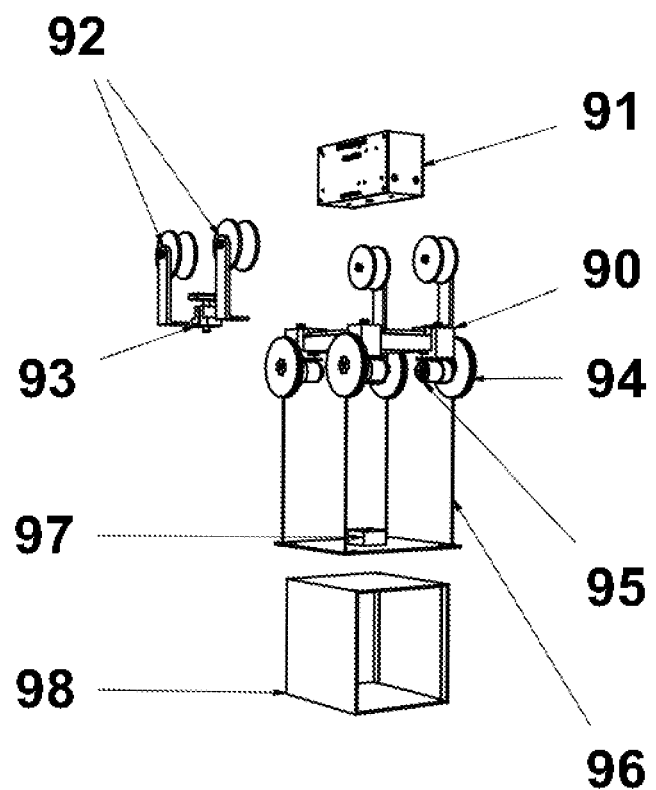
FIG. 25 shows a 1D motorized tray lifter.

In FIG. 25, an embodiment of an equipment tray lifter is shown. In this embodiment, the equipment tray lifter assembly 90 includes four wheels 92 that may roll along the grid tubing's Y axis, and a spring-loaded brake 93 may press against the bottom of the grid tubing and prevent motion until disengaged. In embodiments, the equipment tray lifter may contain motors 95 that take up or let out cables 96 that are connected to the tray 98, thus providing movement in the Z axis. In such embodiments, cables may be wound around cable takeup spools 94, and the motors 95 may be controlled to keep the equipment tray level using a balance controller device 91 that receives balance information from an accelerometer 97 that may be mounted to the top of the equipment tray. In such embodiments, the balance controller device may not be dissimilar to the grid lifter balancing mechanism outlined above in FIGS. 20-22 and in FIG. 24.

Figure 26:
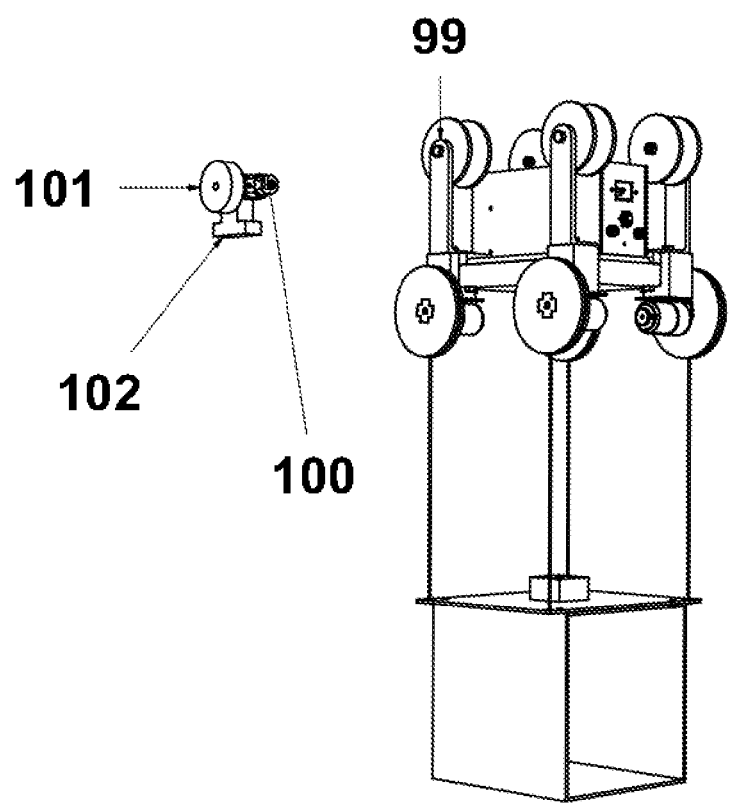
FIG. 26 shows a 3D motorized tray lifter.

In FIG. 26, another embodiment of an equipment tray lifter is shown. In this and similar embodiments, a motor 100 is mounted on the equipment tray lifter 99 via a mounting bracket 102. The motor turns a wheel 101 that engages the bottom of the grid tubing and moves the equipment tray lifter along the Y axis of the grid. In such embodiments, the brake 93 in FIG. 25 may not be required, as the motor 100 may be geared in such a way as to not allow rotation of the motor when the wheel 101 turns. Thus, the motor can move the equipment tray lifter along the Y axis via rotation of the wheel by the rotation of the motor shaft, but manual movement of the equipment tray lifter along the Y axis is not allowed as the wheel cannot turn the motor shaft.

In FIG. 27, an embodiment of the application that may control the motorized grid lifter balancing device as well as tray lifter devices is shown. In embodiments, the application is only usable when motorized grid lifters or tray lifters are available and within network reach. The four buttons shown may only be two buttons, UP and DOWN, if local networking (88 in FIG. 24) determines there are no motorized tray lifters as described in FIG. 26 within networking reach, as the non-motorized tray lifters only move upwards and downwards. If there are motorized tray lifters as described in FIG. 26 then all four buttons may be shown but the LEFT and RIGHT buttons shown in FIG. 27 may be labelled "BACK" and "FRONT", as per FIG. 28, below.

In embodiments, the application may provide the user with an ability to store and retrieve the current positioning information to disk (89 in FIG. 24), as well as manage and otherwise reserve memory locations for common device configurations as follows:

when the user taps a Memory location, for example, 'GenBench' as shown in FIG. 27, the positioning information that may be stored on disk may be applied to all motors of the controlled grid system and thus the grid lifters, if any, and the tray lifters, if any, move to their memorized locations in the Z axis and, if motorized tray lifters are being controlled, they move to their memorized position in either the X axis, for grid systems whose tubing is running left-to-right; or the Y axis, for grid systems whose tubing is running front-to-back;

when the user taps the Memory button 116 the application may popup a menu showing all memory locations, and prompt the user to choose one;

when the user chooses a memory location, the application may display a keyboard and prompt the user to choose a name for this location; and when the user chooses to delete a memory location by either tapping and holding or double-clicking a currently used memory location, the application may prompt the user using some text similar to, "Delete This Memorized Information? Y/N", and then the user may be permitted to delete the memorized information.

Figure 28:
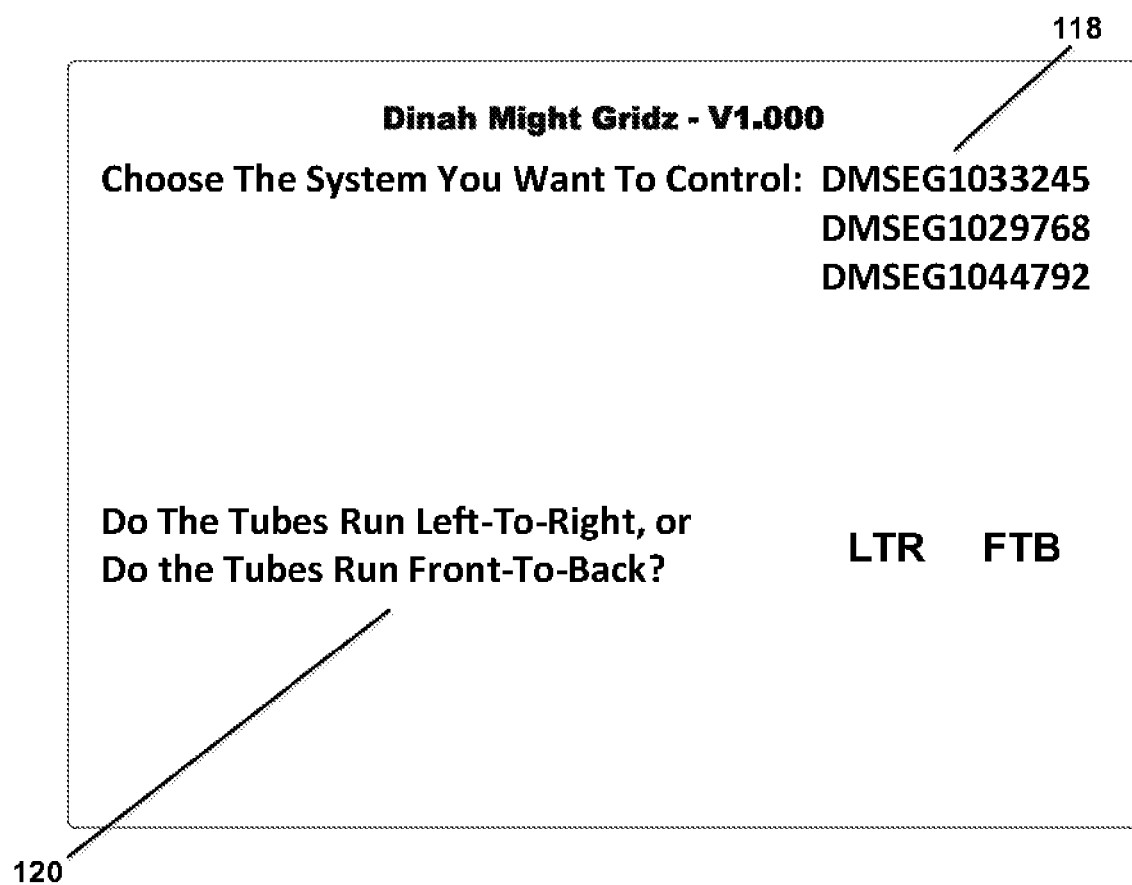
FIG. 28 shows the application setup/configuration display.

In FIG. 28, an embodiment of the application that may provide setup functions is shown. The application may scan for grid lifters and tray lifters, using local networking, and any that are found may be displayed in area 118. The user can then taps or click to select a device to control.

If the application finds motorized tray lifters, it may offer the user the ability to choose the middle two buttons in FIG. 27 by answering the 'tubing orientation' question 120. If the user is offered this option, they may choose whether or not the tubing in the grid runs—from their point of view—'left to right' by tapping the button marked 'LTR' or 'forwards and backwards' by tapping the button marked 'FTB'. If the user chooses 'LTR' then the middle two buttons in FIG. 27 may be labelled, 'Left' and 'Right'; or, if the user chooses 'FTB', then the middle two buttons in FIG. 27 may be labelled, 'Front' and 'Back'.

Figure 29:
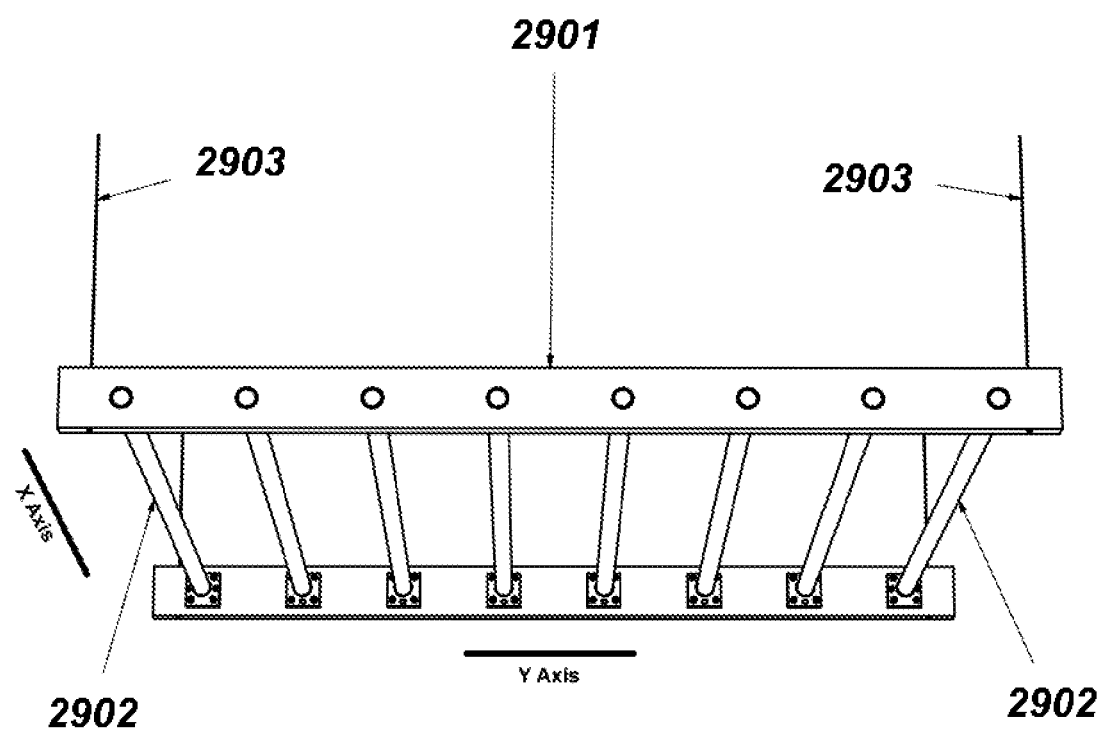
FIG. 29 shows the assembled grid system.

In FIG. 29, the assembled grid system is depicted. The grid tubes 2902 may be fastened onto the grid crosspieces, 2901. In embodiments, each crosspiece has fastening devices which may be attached to cables, 2903, to vertically support the grid.

Figure 30:
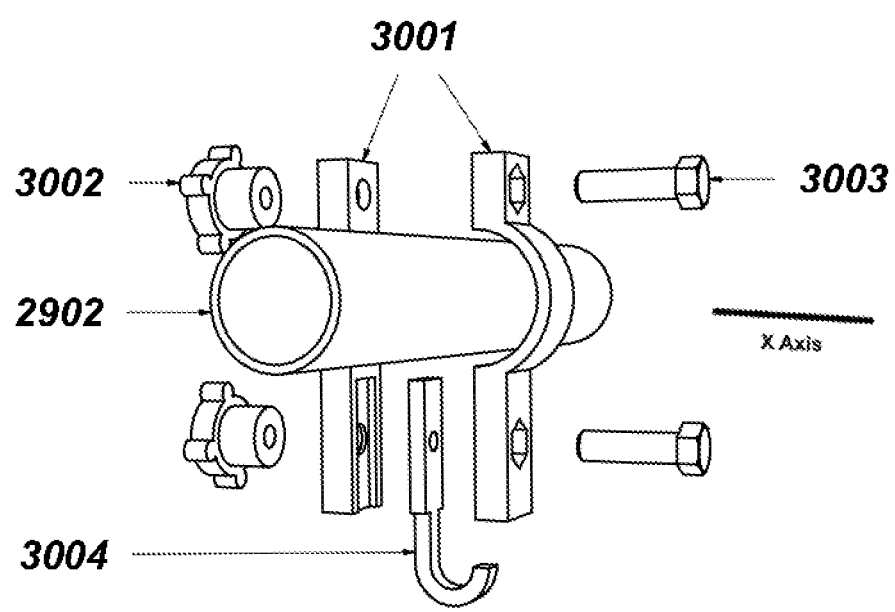
FIG. 30 shows a clamp that attaches to one grid tube.

FIG. 30 shows one embodiment of a single clamp, designed to hold more movable, light-weight objects that do not require the clamp to be stabilized using more than one grid tube. In the embodiment shown, there are two keepers 3001 that are squeezed tightly together via tightening knobs 3002 and bolts 3003, the combination of which prevent movement along the X axis of the tubing. To reposition the clamp, the user removes the top knob 3002 and loosens the bottom knob until one keeper can be rotated 90° around the bottom bolt, at which point the clamp can be removed from the grid tube 2902. The user then repositions the clamp where desired, rotates the previously rotated keeper around its bottom bolt and reinstalls and tightens the knob until both keepers once again provide pressure on the grid tube. In the embodiment shown, the load is hung from the clamp hanger 3004. The embodiment of FIG. 30 is self-balancing as the load is hung directly under the center of the grid tube.

Figure 31A:
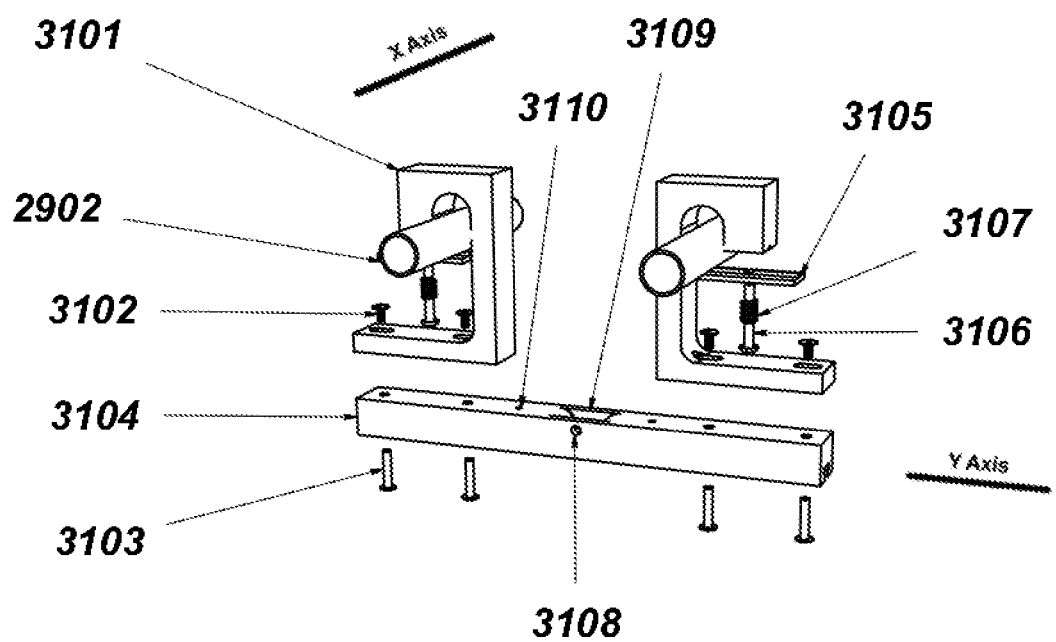
FIG. 31A shows a clamp that attaches to two adjacent grid tubes, and provides for the movement of attached devices both axially along the X axis and orthogonally along the Y axis between the two grid tubes.

In the embodiment of FIG. 31A, individual components of one type of clamp of the grid system can be seen. In this embodiment, two tubing brackets 3101 rest on top of two of the grid system's adjacent tubes 2902. The clamp is held in place along the axial X axis by springs 3107 applying pressure to tubing pressure plates 3105, both of which are held in place by bolts 3106. In embodiments, the tubing brackets attach to a slide bar 3104 in an orthogonal manner using two Chicago bolts 3102 and 3103 in such a manner as to provide equipment with small movement to accommodate tubing that may not have perfect spacing. The slide bar 3104 provides movement in the Y axis between two adjacent tubes. Provisions for routing power or data to/from the clamp are provided by a recess 3109 in the slide bar 3104, holes 3110 for attaching couplings and connector brackets, and a hole 3108 for power/data cable ingress/egress.

Figure 31B:
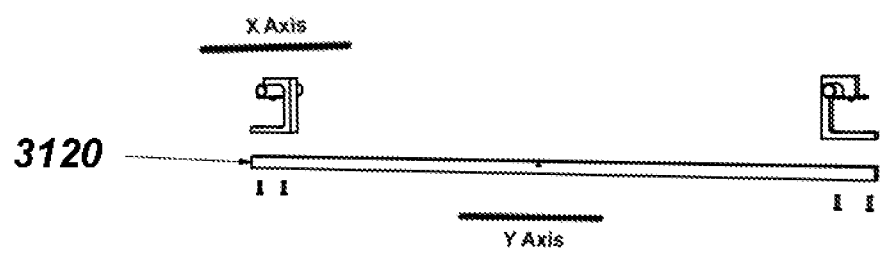
FIG. 31B shows a clamp that attaches to two non-adjacent grid tubes provides for the movement of attached devices both axially along the X axis and orthogonally along the Y axis between the two grid tubes.

In the embodiment shown in FIG. 31B, a longer slide bar 3120 can be seen. This provides for greater movement in the Y axis across the grid than the clamp shown in FIG. 31. The same tubing bracket assemblies shown in FIG. 31A are used to attach the longer slide bar 3120 in an orthogonal manner but with greater space between them for expanded Y axis movement.

Figure 31C:
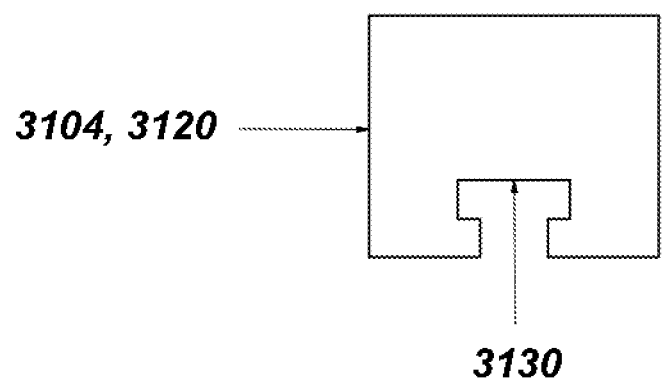
FIG. 31C details the facets of the orthogonal end of the bar that provides for both the attachment of devices as well as their movement along the Y axis.

FIG. 31C illustrates the T-shaped slot 3130 used to attach devices to the slide bar. The T-shaped slot 3130 runs the length of the slide bar, and thus provides for movement across the entire length of the slide bar.

Figure 31D:
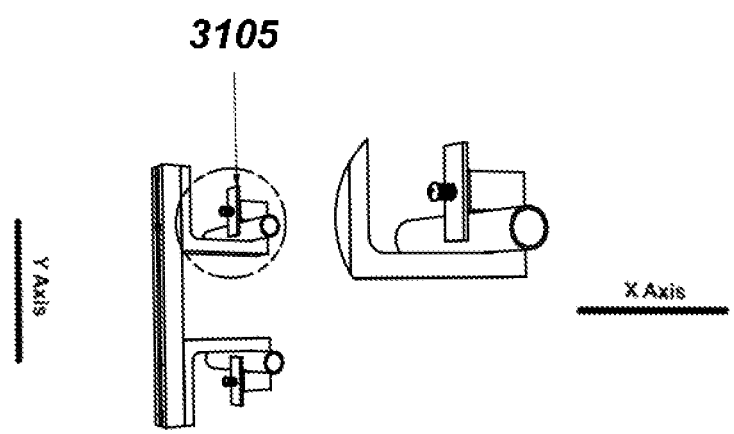
FIG. 31D illustrates the closed position of the device on the clamp in a preventing unwanted axial movement state along the X axis.
Figure 31E:
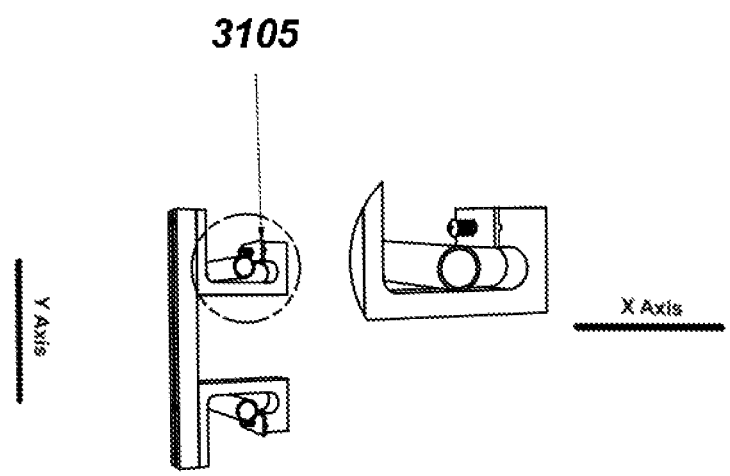
FIG. 31E illustrates the open position of the device on the clamp allowing desired axial movement along the X axis.
Figure 31F:
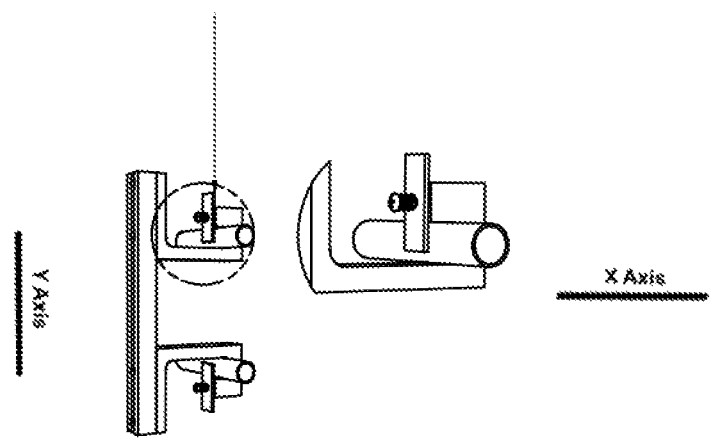
FIG. 31F illustrates the closed position of the device on the clamp preventing further unwanted axial movement along the X axis.

FIGS. 31D through 31F demonstrate the operation of the tubing pressure plates 3105 for movement or relocation of the clamp axially, along the Y axis of the grid. In FIG. 31D, the tubing pressure plate 3105 is orthogonal to the grid tube preventing unwanted X axis movement. In FIG. 31E, the tubing pressure plate 3105 has been rotated 90° so that it is now parallel to the grid tube, allowing axial movement along the tubing X axis or removal from the grid by lifting the clamp off of the grid. In FIG. 31F, the clamp has been relocated and the tubing pressure plate 3105 has again been rotated 90° so that it is orthogonal to the grid tube and thus pressure is again applied against the grid tube.

Figure 32:
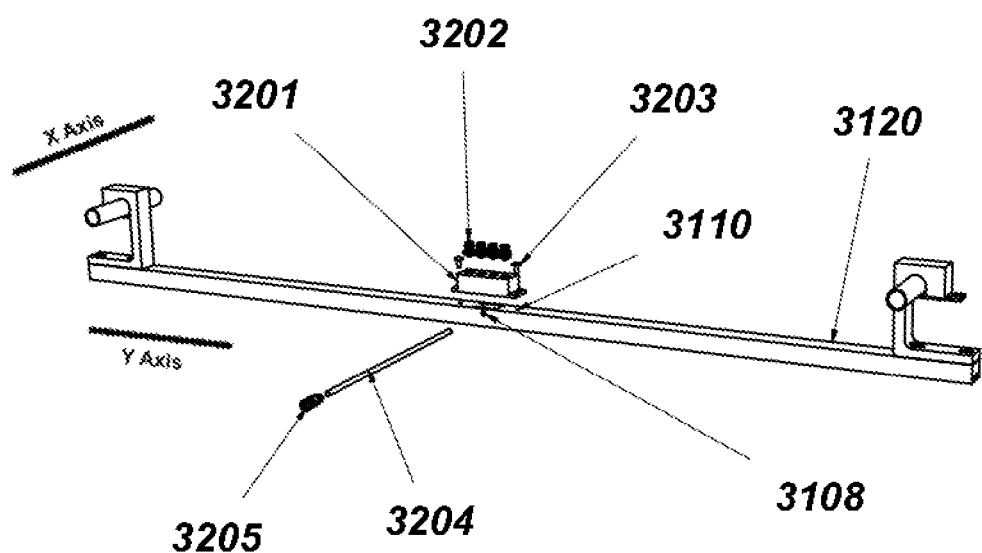
FIG. 32 shows a clamp assembly that provides for the distribution of power to other clamps or attached devices, and provides for movement axially along the X axis and orthogonally along the Y axis between non-adjacent grid tubes.

FIG. 32 illustrates an embodiment of the clamp setup shown in FIG. 31B along with a bracket used to provide power to attached equipment. A distribution bracket 3201 is affixed to the clamp bracket's slide bar 320 using two screws 3203 that connect with the two mounting holes 310 on the slide bar. Affixed to the distribution bracket 3201 are four power connectors 3202 with their requisite cable 3204 exiting the slide bar cable exit hole 308, along with the cable end connector 3205.

Figure 33:
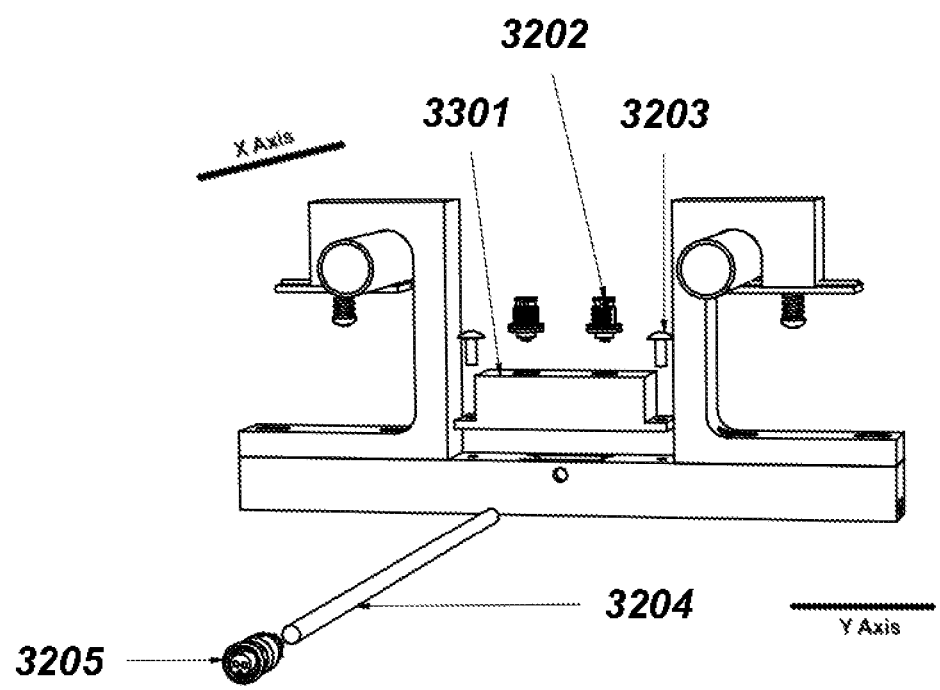
FIG. 33 shows a clamp assembly that provides for the distribution of power to other clamps or attached devices, and provides for movement axially along the X axis and orthogonally along the Y axis between two adjacent grid tubes.

FIG. 33 illustrates an embodiment of the clamp setup shown in FIG. 31B along with a bracket used to provide power to attached equipment. A distribution bracket 3301 is affixed to the clamp bracket's slide bar using two screws 3203. Affixed to the distribution bracket 3301 are two power connectors 3202 with their requisite cable 3204 and cable end connector 3205.

Figure 34:
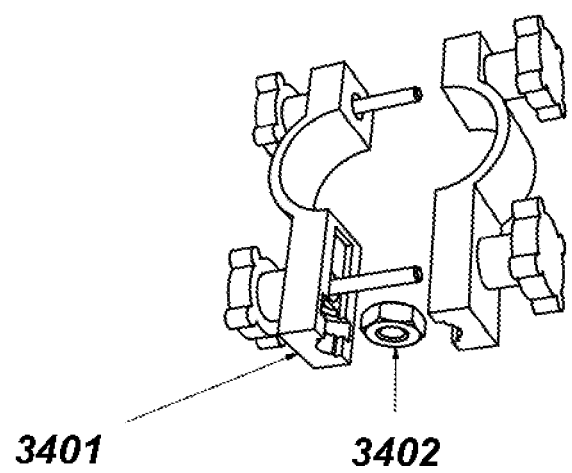
FIG. 34 details the components of a clamp that attaches to one grid tube and provides for the attachment of a bar that provides for non-orthogonal movement across any number of grid tubes.

FIG. 34 illustrates another embodiment of the singleton clamp described in FIG. 30 but with a hex nut 3402 embedded between the singleton keepers 3401. The hex nut 3402 is intended to receive a hex head bolt as further described below.

Figure 35A:
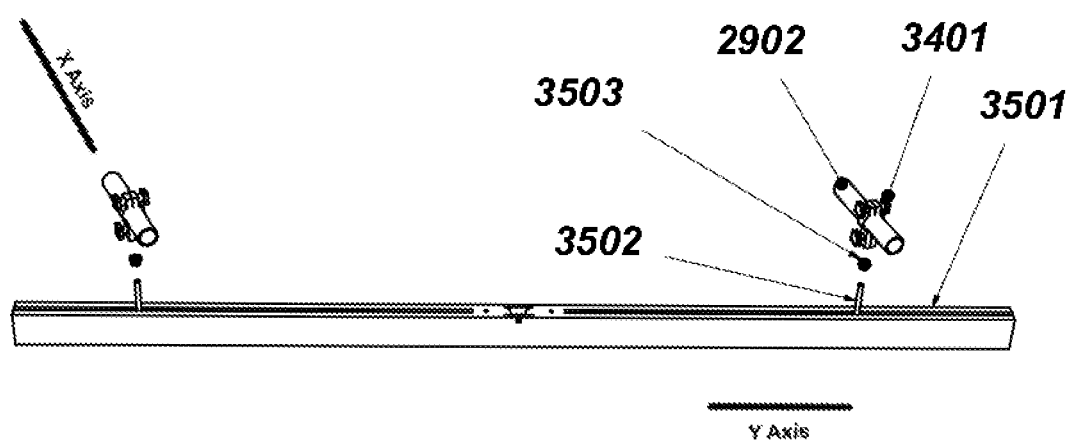
FIG. 35A shows the components of a clamp and bar assembly that provides for the attachment of a bar that provides for non-orthogonal movement across any number of grid tubes.
Figure 35B:
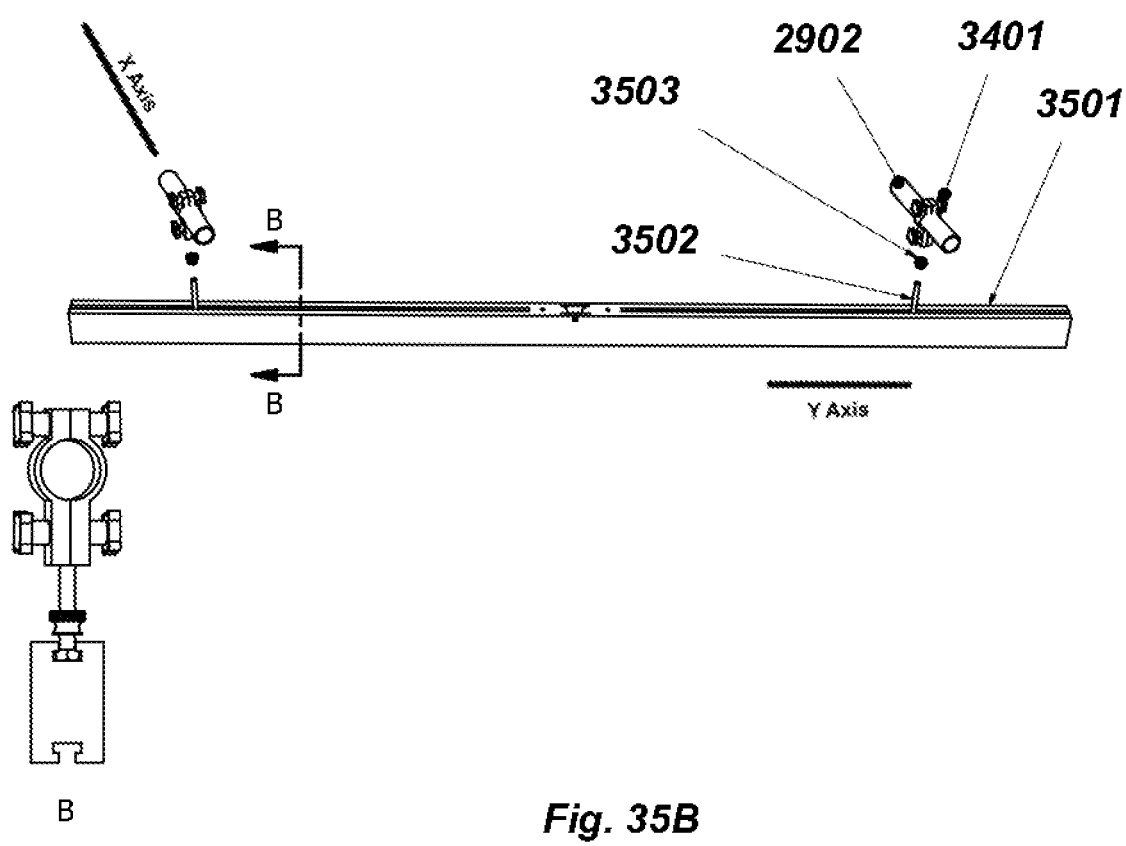
FIG. 35B details the relationship between the clamp shown in FIG. 35A and the manner of its attachment to the bar shown in FIG. 35A.
Figure 35C:
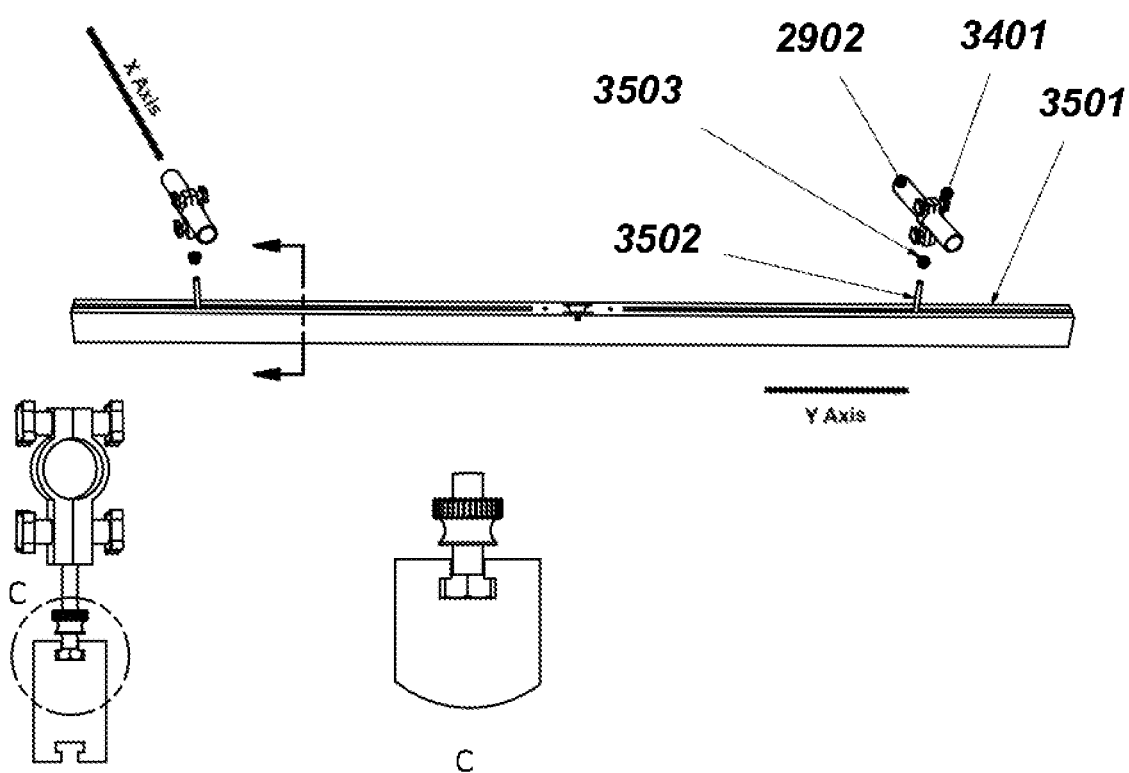
FIG. 35C details the relationship between the locking screw of the clamp and the bar which is attached to it.

FIG. 35A illustrates an embodiment of a clamp created using a slide bar 3501 which can be attached to the grid system in either an orthogonal or a diagonal manner to the tubing X axis. The slide bar 3501 contains two T-slots on its upper surface, as shown in FIG. 35A as well as further detailed in FIGS. 35B and 35C. These T-slots receive a hex head bolt 3502 along with a knurled round nut 3503. The slide bar 3501 is attached to the grid system via two of the singleton clamps 3401 as described in FIG. 34, above and kept in its desired position by tightening the knurled round nuts 3503 against the slide bar 3501. Since the slide bar 3501 can be rotated around each hex head bolt 3502, orthogonal positioning is not requisite, and by placing the two singleton clamps in two non-orthogonal positions on their respective tubes, diagonal positioning can be achieved.

While the foregoing written description enables one of ordinary skill to make and use a device as described, those of ordinary skill will understand and appreciate the existence of variations, combinations, and equivalents of the specific embodiments, methods, and examples herein. The specification described here should therefore not be limited by the above described embodiments, methods, and examples, but by all embodiments and methods within the scope and spirit of the claims.

The invention claimed is:

1. In a three-dimensional grid system for manipulation, organization and management of lighting, power and data, a system of clamps configured for hanging and moving equipment in three dimensions with each clamp in the system comprising:
   a positioning mechanism configured for maintaining position along any of the grid system's X and Y axes;
   a positioning release mechanism; and
   a mechanism configured for holding equipment comprising one or more of a plurality of: hooks; straps; and wire cables.

2. The system of clamps of claim 1, wherein said positioning mechanism comprises one or more knobs and threaded shafts, wherein said one or more knobs can be tightened against said clamps to assure that the clamp cannot move along either the X or the Y axis, and wherein said one or more knobs can be loosened to allow movement along the X or Y axes.

3. The system of clamps of claim 1, wherein said positioning mechanism comprises a spring loaded brake configured for pressing against the bottom of the grid tubes to assure that the clamp cannot move along either the X or the Y axis, and wherein said spring loaded brake can be moved away from the bottom of any said tube to allow movement along the X or Y axis.

4. The system of clamps of claim 1, wherein any clamp of said system of clamps comprises one of a plurality of: strapping, cable, and chain.

5. The system of clamps of claim 1, wherein any clamp of said system of clamps comprises a takeup reel, wherein said takeup reel is configured for having excess strapping, cable and chain wound around it.

6. The system of clamps of claim 1, wherein any clamp of said system of clamps comprises springs configured for compressing the parts of the clamp against the tubing and for providing the ability to allow the clamp to be opened and for moving the clamp to different tubes in the grid system.

7. The system of clamps of claim 1, wherein any clamp of said system of clamps comprises safety mechanisms configured for preventing the clamps from pulling apart when a weight is applied that is greater than the holding weight of said springs.

8. The system of clamps of claim 1, wherein any clamp of said system of clamps may be motorized for axial movement along the tubes, and wherein any clamp of said system of clamps communicates with a processor programmed to control said clamp.

9. In a three-dimensional grid system for manipulation, organization and management of lighting, power and data, a system of brackets configured for hanging and moving equipment in three dimensions with each bracket in the system comprising:
   one or more said clamps; and
   one or more data and power connections for routing and connecting data cables and power cables to any equipment hanging from or otherwise connected to the grid system.

10. The system of brackets of claim 9, wherein each of said brackets that carry power cables and connections comprises a plurality of one of: said power cables and connectors that carry line voltage and said power cables and connectors that carry low-voltage.

11. The system of brackets of claim 9, wherein each of said brackets that carry data cables and connections comprises a plurality of cables configured for carrying fiber signals and cables configured for carrying electrical signals.

12. The system of brackets of claim 9, wherein each of said brackets comprises a horizontal bar, wherein said bar defines a T-slot for mounting equipment to the grid system and moving said equipment horizontally along the X and Y axis.

* * * * *